(12) United States Patent
Choi et al.

(10) Patent No.: US 11,596,905 B2
(45) Date of Patent: Mar. 7, 2023

(54) METHOD OF PREPARING HETEROGENEOUS ZEOLITE MEMBRANES

(71) Applicant: Korea University Research and Business Foundation, Seoul (KR)

(72) Inventors: Jungkyu Choi, Seoul (KR); Kwan Young Lee, Seoul (KR); Yang-Hwan Jeong, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/901,191

(22) Filed: Sep. 1, 2022

(65) Prior Publication Data
US 2023/0001361 A1 Jan. 5, 2023

Related U.S. Application Data

(62) Division of application No. 16/822,211, filed on Mar. 18, 2020, now Pat. No. 11,465,102.

(30) Foreign Application Priority Data

Mar. 18, 2019 (KR) .......................... 10-2019-0030645

(51) Int. Cl.
*B01D 53/22* (2006.01)
*B01D 71/02* (2006.01)
(Continued)

(52) U.S. Cl.
CPC ....... *B01D 71/028* (2013.01); *B01D 67/0072* (2013.01); *B01D 69/10* (2013.01); *B01D 69/12* (2013.01); *B01D 2257/504* (2013.01)

(58) Field of Classification Search
CPC .. B01D 69/12; B01D 69/10; B01D 2257/504; B01D 67/0072; B01D 71/028
See application file for complete search history.

(56) References Cited

U.S. PATENT DOCUMENTS 6,198,208 B1 3/2001 Yano et al.
6,953,493 B2 10/2005 Nakayama et al.
(Continued)

FOREIGN PATENT DOCUMENTS

JP 2004-294755 A 10/2004
JP 2017-170444 A 9/2017
(Continued)

OTHER PUBLICATIONS

Jeon et al., "Ultra-selective high-flux membranes from directly synthesized zeolite nanosheets," Nature, 2017, vol. 543, 690-691, 17 pages.
(Continued)

*Primary Examiner* — Anthony R Shumate
(74) *Attorney, Agent, or Firm* — NSIP Law

(57) ABSTRACT

Disclosed are a heterogeneous zeolite membrane and a method of preparing the same, and more particularly a heterogeneous zeolite membrane that has CHA and DDR zeolite structures by growing seed particles into a crystal structure different from that of the zeolite membrane and can thus separate $CO_2/N_2$ and $CO_2/CH_4$ even under wet conditions, a method of preparing the same, and a method of capturing and removing carbon dioxide using the membrane.

7 Claims, 45 Drawing Sheets

(51) Int. Cl.
  *B01D 67/00* (2006.01)
  *B01D 69/10* (2006.01)
  *B01D 69/12* (2006.01)

(56) References Cited

U.S. PATENT DOCUMENTS

| | | | |
|---|---|---|---|
| 7,282,082 B2 | 10/2007 | Yuen | |
| 8,302,782 B2* | 11/2012 | Falconer | B01D 67/0058 210/500.25 |
| 9,555,377 B2 | 1/2017 | Isomura et al. | |
| 9,901,882 B2 | 2/2018 | Haigo et al. | |
| 2009/0111959 A1* | 4/2009 | Cao | B01J 35/002 423/230 |
| 2013/0064747 A1* | 3/2013 | Zhou | B01D 69/10 502/4 |
| 2014/0291245 A1* | 10/2014 | Inukai | B01D 71/028 210/651 |
| 2014/0315709 A1* | 10/2014 | Choi | B01J 20/3214 502/4 |
| 2014/0331860 A1 | 11/2014 | Isomura et al. | |
| 2016/0023187 A1* | 1/2016 | Hedlund | B01J 29/084 502/64 |
| 2016/0175759 A1 | 6/2016 | Carstensen et al. | |
| 2017/0225130 A1* | 8/2017 | Noda | B01D 71/022 |
| 2017/0368509 A1* | 12/2017 | Nagasaka | B01J 37/0244 |
| 2018/0185792 A1* | 7/2018 | Choi | C01B 39/48 |
| 2019/0143296 A1* | 5/2019 | Choi | B01J 20/28033 95/51 |
| 2019/0292062 A1* | 9/2019 | Yoshimura | B01D 67/0051 |
| 2020/0246775 A1* | 8/2020 | Hedlund | B01D 63/066 |
| 2020/0384423 A1* | 12/2020 | Miura | B01D 69/12 |

FOREIGN PATENT DOCUMENTS

| | | |
|---|---|---|
| JP | 2018-505772 A | 3/2018 |
| KR | 10-1209033 B1 | 12/2012 |
| KR | 10-2016-0062446 A | 6/2016 |
| KR | 10-2016-0068552 A | 6/2016 |
| KR | 10-2017-0049317 A | 5/2017 |
| KR | 10-2018-0130940 A | 12/2018 |
| KR | 10-1927889 B1 | 12/2018 |
| KR | 10-2019-0001141 A | 1/2019 |
| KR | 10-2019-0044945 A | 5/2019 |

OTHER PUBLICATIONS

Tung et al., Growth of Uniformly Oriented Silica MFI and BEA Zeolite Films on Substrates, Science, Dec. 16, 2011, vol. 334, pp. 1533-1538.

Den Exter et al., "Separation of Permanent Gases on the All-Silica 8-Ring Clathrasil DD3R," Stud. Surf. Sci. Catal., 1994, vol. 84, pp. 1159-1166.

Gücüyener et al., "Facile synthesis of the DD3R zeolite: performance in the adsorptive separation of buta-1,3-diene and but-2-ene isomers," Journal of Materials Chemistry, 2011, vol. 21, pp. 18386-18397.

Kim et al., "Synthesis and sonication-induced assembly of Si-DDR particles for close-packed oriented layers," Chem. Commun., 2013, vol. 49, pp. 7418-7420.

Kalipcilar et al., "Synthesis and Separation Performance of SSZ-13 Zeolite Membranes on Tubular Supports," Chem. Mater., 2002, vol. 14, pp. 3458-3464.

Robson, "How to read a patent," Microporous Materials, 1998, vol. 22, pp. 551-666.

Kuhn et al., "Detemplation of DDR type zeolites by ozonication," Microporous Mesoporous Materials, 2009, vol. 120, pp. 12-18.

Kim et al., "An oriented, siliceous deca-dodecasil 3R (DDR) zeolite film for effective carbon capture: insight into its hydrophobic effect," Journal of Materials Chemistry A, 2017, vol. 5, pp. 11246-11254.

Kim et al., "Uniform Si-CHA Zeolite Layers Formed by a Selective Sonication-Assisted Deposition Method," Angew. Chem. Int. Ed., 2013, vol. 52, pp. 5280-5284.

Merkel et al., "Power plant post-combustion carbon dioxide capture: An opportunity for Membranes," Journal of Membrane Science, 2010, vol. 359, pp. 126-139.

Singh et al., "Techno-economic study of $CO_2$ capture from an existing coal-fired power plant: MEA scrubbing vs. $O_2/CO_2$ recycle combustion," Energy Conversion and Management, 2003, vol. 44, pp. 3073-3091.

D'Alessandro et al., "Carbon Dioxide Capture: Prospects for New Materials," Angew. Chem. Int. Ed, 2010, vol. 49, pp. 6058-6082.

Mofarahi et al., "Design of $CO_2$ absorption plant for recovery of $CO_2$ from flue gases of gas turbine," Energy, 2008, vol. 33, pp. 1311-1319.

Xu et al., "Adsorption separation of carbon dioxide from flue gas of natural gas-fired boiler by a novel nanoporous 'molecular basket' adsorbent," Fuel Processing Technology, 2005, vol. 86, pp. 1457-1472.

Halmann et al., "Fuel saving, carbon dioxide emission avoidance, and syngas production by tri-reforming of flue gases from coal-and gas-fired power stations, and by the carbothermic reduction of iron oxide," Energy, 2006, vol. 31, pp. 3171-3185.

Bolland et al., "New Concepts for Natural Gas Fired Power Plants Which Simplify the Recovery of Carbon Dioxide," Energy Convers. Mgmt., 1992, vol. 33, pp. 467-475.

Bonilla et al., "Fluorescence confocal optical microscopy imaging of the grain boundary structure of zeolite MFI membranes made by secondary (seeded) growth," Journal of Membrane Science, 2001, vol. 182, pp. 103-109.

Choi et al., Grain Boundary Defect Elimination in a Zeolite Membrane by Rapid Thermal Processing, Science, Jul. 31, 2009, vol. 325, pp. 590-593.

Lee et al., "On the performance of c-oriented MFI zeolite Membranes treated by rapid thermal processing," Journal of Membrane Science, 2013, vol. 436, pp. 79-89.

Choi et al., "Uniformly α-Oriented MFI Zeolite Films by Secondary Growth," Angew. Chem. Int. Ed., 2006, vol. 45, pp. 1154-1158.

Kim et al., "Mono-dispersed DDR zeolite particles by seeded growth and their $CO_2$, $N_2$, and $H_2O$ adsorption properties," Chemical Engineering Journal, 2016, vol. 306, pp. 876-888.

Bernal et al., "Separation of $CO_2/N_2$ Mixtures Using MFI-Type Zeolite Membranes," AIChE Journal, Jan. 2004, vol. 50, pp. 127-135.

Ryckebosch et al., "Techniques for transformation of biogas to biomethane," Biomass and Bioenergy, 2011, vol. 35, pp. 1633-1645.

Weiland, "Biogas production: current state and perspectives," Appl. Microbiol Biotechnol, 2010, vol. 85, pp. 849-860.

Himeno et al., "Synthesis and Permeation Properties of a DDR-Type Zeolite Membrane for Separation of $CO_2/CH_4$ Gaseous Mixtures," Ind. Eng. Chem. Res., 2007, vol. 46, pp. 6989-6997.

Hong et al., "Healing of Microdefects in SSZ-13 Membranes via Filling with Dye Molecules and Its Effect on Dry and Wet $CO_2$ Separations," Chemistry of Materials, 2018, vol. 30, pp. 3346-3358.

Kosinov et al., "High flux high-silica SSZ-13 membrane for $CO_2$ separation," J. Mater. Chem. A, 2014, vol. 2, pp. 13083-13092.

Chen et al., "Fabrication of high-flux SAPO-34 membrane on a-$Al_2O_3$ four-channel hollow fibers for $CO_2$ capture from $CH_4$," Journal of $CO_2$ Utilization, 2017, vol. 18, pp. 30-40.

Wang et al., "Preparation of defect-free DDR zeolite membranes by eliminating template with ozone at low temperature," Journal of Membrane Science, 2017, vol. 539, pp. 152-160.

Gu et al., "Synthesis of Defect-Free FAU-Type Zeolite Membranes and Separation for Dry and Moist $CO_2/N_2$ Mixtures," Ind. Eng. Chem. Res., 2005, vol. 44, pp. 937-944.

Japanese Office Action dated Mar. 30, 2021 in counterpart Japanese Patent Application No. 2020-046048 (4 pages in English and 4 pages in Japanese).

Korean Notice of Allowance dated May 14, 2020 in corresponding Korean Patent Application No. 10-2019-0030645 (2 pages in Korean).

(56) References Cited

OTHER PUBLICATIONS

Xu et al., "Synthesis of ZSM-5/NaA hybrid zeolite membrane using kaolin as modified layer," New Journal of Chemistry, Mar. 15, 2018, 36 pages.
ChemSpider "Amantadine_C10H17N_ChemSpider" http://www.chemspider.com/chemical-structure.2045.html> 5 pages, retrieved Nov. 25, 2021 (Year: 2021).

\* cited by examiner

DDR@CHA_4d

DDR@CHA_6d

DDR@CHA_8d

DDR@CHA_10d

METHOD OF PREPARING HETEROGENEOUS ZEOLITE MEMBRANES

CROSS-REFERENCE TO RELATED APPLICATION(S)

This application is divisional of U.S. patent application Ser. No. 16/822,211 filed on Mar. 18, 2020, which claims the benefit under 35 USC 119(a) of Korean Patent Application No. 10-2019-0030645 filed on Mar. 18, 2019, in the Korean Intellectual Property Office, the entire disclosures of which are incorporated herein by reference for all purposes.

TECHNICAL FIELD

The present invention relates to a heterogeneous zeolite membrane and a method of preparing the same, and more particularly to a heterogeneous zeolite membrane that has two zeolite structures of chabazite (CHA) and deca-dodecasil 3 rhombohedral (DDR), each capable of selectively separating carbon dioxide, and can thus separate $CO_2/N_2$ and $CO_2/CH_4$ even under wet conditions, a method of preparing the same and a method of capturing and removing carbon dioxide using the membrane.

BACKGROUND ART

Zeolites are aluminosilicate crystalline materials that have regular and rigid microporous structures. Because the size of the pore structures is close to those of permanent gases, a zeolite, if appropriately selected, can act as a molecular sieve, functioning analogously to conventional sand/stone/gravel sieves used at construction sites. Indeed, zeolite membranes have high potential for use in distinguishing minute differences in the shape and size of permanent gases, thus achieving energy-efficient gas separation (Jeon, M. Y. et al., *Nature* 2017, 543, 690-691; Tung, C. T. P. et al., *Science* 2011, 334, 1533-1538).

Among zeolite membranes, zeolite membranes having a DDR crystal structure have problems of difficulty in synthesizing DDR seed particles and very low reproducibility. Even when DDR structured particles are synthesized, there is a limitation in that it is difficult to obtain DDR seed particles having uniformity and size suitable for use as seed particles. Thus, such zeolite membranes are unsuitable for use in applied industrial processes despite the high potential thereof as a membrane. This is due to the absence to date of a robust method capable of reproducibly producing high-performance DDR structured zeolite membranes. Although a zeolite membrane synthesized using a seed growth (or secondary growth) method has the possibility of having reproducible separation performance, reproducible production of membranes having high separation ability using zeolite crystals with DDR structure is very rare even when this method is applied.

Zeolite membranes are usually produced using a seed growth method. In this case, seed particles having the same zeolite crystal structure as the zeolite constituting the membrane are uniformly deposited on a porous support (serving as a seed layer), and then a membrane is continuously grown. Therefore, in order to produce zeolite membranes with a CHA or DDR structure using conventional methods, the crystal structure of the zeolite constituting the seed particles should be the same as the crystal structure of the zeolite constituting the membrane. However, previously reported methods of synthesizing DDR zeolite particles are complicated and difficult, poorly reproducible, and limitedly able to realize an appropriate particle size. The drawbacks of these methods of synthesizing seed particles having a DDR structure make it difficult to produce a continuous DDR zeolite membrane with the seed growth method using the same.

The literature on methods of synthesizing zeolite particles having a DDR structure and previously reported methods teach that it is difficult to synthesize reproducible zeolite particles having a DDR structure (den Exter et al., Stud. Surf. Sci. Catal., 1994, 84, 1159-1166; Gucuyener et al., J. Mater. Chem., 2011, 21, 18386-18397; Kim et al., Chem. Commun., 2013, 49, 7418-7420). In addition, even when seed particles having a DDR structure are synthesized through a conventional method, a number of literature report that zeolite membranes having a DDR structure produced through seed growth using synthesized DDR particles have very low carbon dioxide/nitrogen separation performance.

Korean Patent No. 10-1927889 discloses a membrane having a DDR structure. In addition, U.S. Pat. Nos. 9,901,882, 6,953,493 and 7,282,082 disclose a CHA or DDR zeolite membrane produced using zeolites, wherein the crystal structure of the seed particles is the same as the crystal structure of the membrane formed thereon. This method uses DDR zeolite seed particles which are difficult and complicated to synthesize into the same structure as the membrane using a conventional seed growth method to produce a membrane having a DDR structure, thus having the difficulty of producing a zeolite membrane.

Therefore, as a result of extensive efforts to solve these problems, the present inventors found that a heterogeneous zeolite membrane having both CHA and DDR zeolite crystal structures produced by using zeolite particles having a CHA structure, which are a representative zeolite crystal structure, are highly reproducible and can be easily synthesized, as seed particles, and by growing the seed particles into a crystal structure different from that of the zeolite membrane is more effective for carbon dioxide separation than a conventional zeolite membrane, and particularly exhibits high $CO_2/N_2$ and $CO_2/CH_4$ separation performance even under wet conditions. Based on this finding, the present invention has been completed.

SUMMARY OF THE INVENTION

Therefore, the present invention has been made in view of the above problems, and it is one object of the present invention to provide a membrane having higher $CO_2/N_2$ and $CO_2/CH_4$ separation performance than conventional zeolite membranes in both dry and wet conditions and a method of preparing the same.

It is another object of the present invention to provide a method of separating $CO_2$ using the membrane.

In accordance with an aspect of the present invention, the above and other objects can be accomplished by the provision of a method of preparing a heterogeneous zeolite membrane comprising: (a) forming a seed layer by depositing zeolite particles having a CHA structure on a support; and (b) producing a DDR@CHA heterogeneous zeolite membrane by performing hydrothermal synthesis on the support having the seed layer in the presence of a DDR precursor solution.

In accordance with another aspect of the present invention, there is provided a method of preparing a heterogeneous zeolite membrane comprising: (a) forming a seed layer by depositing zeolite particles having a DDR structure on a support; and (b) producing a CHA@DDR heterogeneous zeolite membrane by performing hydrothermal synthesis on the support having the seed layer in the presence of a CHA precursor solution.

In accordance with another aspect of the present invention, there is provided a heterogeneous zeolite membrane produced by the method, wherein CHA and DDR zeolite structures coexist in the zeolite membrane.

In accordance with yet another aspect of the present invention, there is provided a method for separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the heterogeneous zeolite membrane.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Unless defined otherwise, all technical and scientific terms used herein have the same meanings as appreciated by those skilled in the field to which the present invention pertains. In general, the nomenclature used herein is well-known in the art and is ordinarily used.

In an attempt to overcome the problem of the difficulty of producing a reproducible DDR zeolite membrane with high separation performance due to the difficulty of producing seed particles having a DDR structure in the production of zeolite membranes, a heterogeneous zeolite membrane having both CHA and DDR zeolite crystal structures is produced by using zeolite particles having a CHA structure, which are a representative zeolite crystal structure, are highly reproducible and can be easily synthesized, as seed particles, and growing the seed particles into a crystal structure different from that of the zeolite membrane and the heterogeneous zeolite membrane is found to be more effective for carbon dioxide separation than a conventional zeolite membrane, and particularly exhibit high $CO_2/N_2$ and $CO_2/CH_4$ separation performance even under wet conditions.

Therefore, in one aspect, the present invention provides a method of preparing a heterogeneous zeolite membrane comprising: (a) forming a seed layer by depositing zeolite particles having a CHA structure on a support; and (b) producing a DDR@CHA heterogeneous zeolite membrane by performing hydrothermal synthesis on the support having the seed layer in the presence of a DDR precursor solution.

Therefore, in another aspect, the present invention provides a method of preparing a heterogeneous zeolite membrane comprising: (a) forming a seed layer by depositing zeolite particles having a DDR structure on a support; and (b) producing a CHA@DDR heterogeneous zeolite membrane by performing hydrothermal synthesis on the support having the seed layer in the presence of a CHA precursor solution.

The heterogeneous zeolite membrane is represented by "membrane structure@seed particle structure" using the symbol "@" throughout the specification of the present invention. For example, a heterogeneous zeolite membrane having a DDR membrane using seed particles having a CHA structure may be represented by "DDR@CHA".

Figure 1:
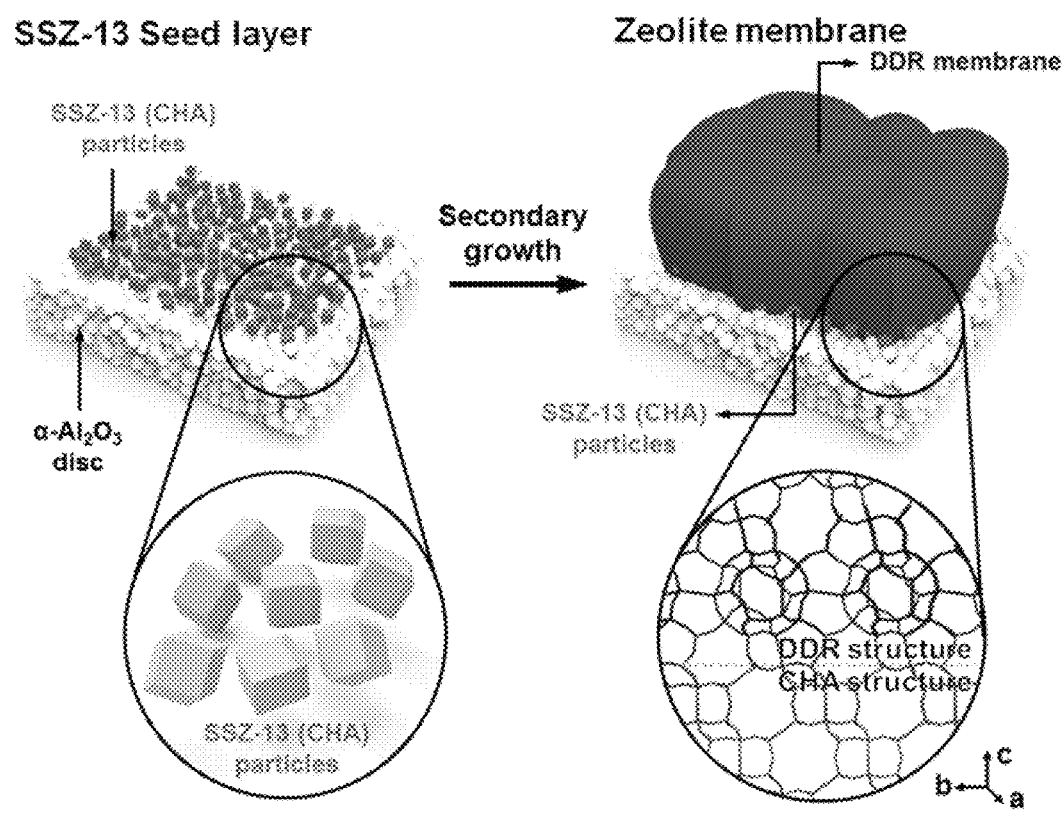
FIG. 1 is a schematic diagram showing a DDR@CHA heterogeneous membrane according to one embodiment of the present invention.

A schematic diagram showing a method for producing a DDR@CHA heterogeneous zeolite membrane including a membrane having a DDR structure which is effective for carbon dioxide separation using seed particles having a CHA structure according to the present invention is shown in FIG. 1.

The secondary growth method for forming the zeolite membrane refers to the entire process including depositing zeolite seed particles on the surface of a porous support and filling the gaps between the seed particles through hydrothermal treatment. However, the stringent conditions for epitaxial growth into the same type of crystals as the seed layer limit the type of high levels of zeolite membrane. In consideration of this, for the first time, deposition and growth between heterogeneous crystals were attempted by producing a ZSM-58 (DDR type zeolite) membrane containing a high amount of silica on the SSZ-13 (CHA type zeolite) seed layer. This is due to the structural similarity of CHA and DDR zeolites. The resulting membrane has excellent $CO_2$ permeance selectivity. In addition, the heterogeneous zeolite membrane mainly includes DDR zeolites containing a high amount of silica, thus efficiently maintaining high $CO_2$ permeance selectivity even in the presence of water vapor.

The present invention provides a method capable of reproducibly synthesizing a DDR@CHA heterogeneous zeolite membrane having high separation performance using, as seeds, SSZ-13 particles that are relatively easily synthesized and have a simple CHA structure, unlike a conventional production method using seed particles having the same DDR structure as the crystal structure of the membrane.

In addition, the present invention provides a method capable of reproducibly synthesizing a continuous CHA@DDR heterogeneous zeolite membrane by inducing a CHA structure from a seed layer composed of seed particles having a DDR structure in the opposite direction. That is, a heterogeneous zeolite membrane in which CHA and DDR zeolite structures coexist in one zeolite membrane can be produced.

Representative advantages of the use of CHA type seed particles for heterogeneous zeolite membranes are as follows.

(1) The hydrothermal synthesis time (7 days) of SSZ-13 seed particles is shorter than the hydrothermal synthesis time (25 days) of DDR seed particles. This confers an economic advantage because hydrothermal synthesis reactions require high temperatures.

(2) The solution for the synthesis of DDR seed particles contains two organic structure derivatives and thus is not economically efficient compared to SSZ-13 seed particles which require one organic structure derivative.

(3) DDR seed particles with low reproducibility waste organic structure derivatives and reduce economical efficiency because organic structure derivatives are required for the synthesis of seed particles.

(4) The synthetic solution for the production of DDR seed particles involves a preparation process at 95° C., which is a high temperature, whereas the synthetic solution for SSZ-13 seed particles enables the overall preparation process at room temperature.

(5) Seed particles for the production of membranes should be small and uniform. It is difficult to control the particle size of DDR seed particles, while it is easy to control the particle size of SSZ-13 seed particles.

In an embodiment of the present invention, a synthetic solution having a Si/Al ratio of 5 to ∞ is used to synthesize seed particles having SSZ-13 zeolite with a CHA structure or to synthesize a membrane to be formed. An optimal heterogeneous zeolite membrane having both CHA and DDR structures can be produced using the same.

In the present invention, the DDR precursor solution may be composed of $SiO_2$, organic-structure-directing agent, $Na_2O$, $H_2O$ and $Al_2O_3$ at a molar ratio of 100:1 to 1000:0 to 500:10 to 100000:0 to 10, and the organic-structure-directing agent may include one or more selected from the group consisting of methyltropinium iodide, methyltropinium bromide, methyltropinium fluoride, methyltropinium chloride, methyltropinium hydroxide, quinuclidinium, ethylenediamine and adamantylamine.

In the present invention, preferably the DDR precursor solution may be composed of $SiO_2$, methyltropinium salt, $Na_2O$, $H_2O$ and $Al_2O_3$ at a molar ratio of 100:1 to 1000:0 to 500:10 to 100000:0 to 10.

In the present invention, the CHA precursor solution may be composed of an organic-structure-directing agent, $SiO_2$, $H_2O$, $Na_2O$ and $Al_2O_3$ at a molar ratio of 1 to 100:100:1000 to 20000:1 to 50:0 to 10, and the organic-structure-directing agent may include one or more selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantylammonium iodide), TEAOH (tetraethylammonium hydroxide), TEABr (tetraethylammonium bromide), TEAF (tetraethylammonium fluoride), TEACl (tetraethylammonium chloride), TEAIAl (tetraethylammonium iodide), dipropylamine and cyclohexylamine.

In the present invention, the support, which is a ceramic, may include at least one selected from the group consisting of α-alumina, γ-alumina, polypropylene, polyethylene, polytetrafluoroethylene, polysulfone, polyimide, silica, glass, mullite, zirconia, titania, yttria, ceria, vanadia, silicon, stainless steel, carbon, calcium oxide and phosphorus oxide.

In the present invention, in step (b), hydrothermal synthesis may be carried out at a temperature of 100 to 200° C. for 12 to 300 hours.

In the present invention, the method may further include drying after hydrothermal synthesis of step (b).

In the present invention, it is found that the heterogeneous zeolite membrane prepared by the method can effectively separate carbon dioxide alone during separation of carbon dioxide/nitrogen and separation of carbon dioxide/methane for methane upgrading from the exhaust gas after combustion by forming the crystal structure of the seed particles different from that of the membrane.

In another aspect, the present invention provides a heterogeneous zeolite membrane produced by the method, wherein CHA and DDR zeolite structures coexist in the zeolite membrane.

In another aspect, the present invention provides a method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the heterogeneous zeolite membrane.

In the use of the heterogeneous zeolite membrane according to the present invention, the separation of carbon dioxide includes all of separation, capture and removal of carbon dioxide.

Hereinafter, the present invention will be described in more detail with reference to examples. However, it will be obvious to those skilled in the art that these examples are provided only for illustration of the present invention and should not be construed as limiting the scope of the present invention.

EXAMPLE

Production Example 1: Production of DDR@CHA Heterogeneous Membrane

Synthesis of SSZ-13 (CHA) Particles

SSZ-13 (CHA-type zeolite) seed particles were synthesized in accordance with a modification of a previously reported method (H. Kalipcilar et al., *Chem. Mater.* 14, 3458-3464 (2002); H. Robson, *Microporous Mesoporous Mater.* 22, 551-551 (1998)). Conventional SSZ-13 particles (~0.7 μm and ~5 μm) are not only too large in size for use as seed particles, but also have two particle size distributions, and seed particles having a small and uniform size should be used to form a uniform seed layer. A modified synthesis method with reduced molar concentration of distilled water resulted in the synthesis of small (approximately~230 nm) and uniformly sized SSZ-13 particles.

N,N,N-trimethyl-1-adamantammonium hydroxide (TMAdaOH, 25%, Sachem) was injected into a polypropylene bottle containing distilled water. Then, sodium hydroxide was added to the solution (=98% pellets, Sigma-Aldrich). The synthesized mixture was homogenized using a mixer for 20 minutes (JeioTech, Si-300R). Then, LUDOX® HS-40 colloidal silica (40 wt % suspension in $H_2O$, Sigma-Aldrich), as a silica raw material, was slowly added dropwise to the mixture, which was stirred to homogeneity. Finally, aluminum hydroxide (reagent grade, Sigma-Aldrich) was dissolved in the mixture. The synthesized mixture was further stirred for 2 days at room temperature. The final molar composition of the synthesis solution was 100 $SiO_2$: 20 NaOH: 5 $Al(OH)_3$: 20 TMAdaOH: 1600 $H_2O$, and the original content of distilled water in the literature was 4400 (H. Kalipcilar et al., *Chem. Mater.* 14, 3458-3464 (2002)). Subsequently, the prepared synthetic precursor was transferred to a Teflon liner (45 mL), and the liner was inserted into a stainless-steel autoclave. The autoclave was transferred to an oven (Pluskolab, PL_HV_250) preheated to 160° C. and rotated at ~45 rpm. After 7 days, synthesis was terminated by immersing the autoclave in tap water to cool the same. The hard product was recovered after performing, five times, a series of (1) centrifugation (centrifuge; Hanil Science Industrial, Combi-514R), (2) adding distilled water and (3) dispersion in fresh distilled water. The recovered particles were dried in a drying oven (Pluskolab, HB-502M) at 70° C. and calcined at 550° C. for 12 hours with a ramp rate of 1° C.·min$^{-1}$ while making air flow (200 mL·min$^{-1}$) into a furnace (Pluskolab, CRF-M20-UP).

Formation of SSZ-13 (CHA) Seed Layer

About 0.03 g of calcined SSZ-13 (CHA-type zeolite) seed particles was added to 40 mL of ethanol to prepare a seed suspension. The suspension was sonicated (JeioTech, UC-10) for 20 minutes to obtain a homogeneous dispersion in a conical centrifuge tube (50 mL of volume; Falcon), and the homogeneous dispersion was poured into a petri dish. Then, the polished surface of the α-$Al_2O_3$ disc was made to contact a suspension in which seed particles are dispersed for 30 seconds. Then, the α-$Al_2O_3$ disc was slowly lifted up as the surface of the suspension was wiped and the disc was dried for 30 seconds. This dip-coating process was repeated four times to completely cover the surface. The seed-particle-coated α-$Al_2O_3$ disc was calcined at 450° C. for 4 hours with a ramp rate of 1° C.·min$^{-1}$ in a furnace.

Synthesis of Organic-Structure-Directing Agent (SDA) for DDR@CHA Membrane Production Methyltropinium iodide (MTI) is known as an organic-structure-directing agent for the synthesis of ZSM-58 (DDR-type zeolite) (J. Kuhn et al., *Microporous Mesoporous Mater.* 120, 12-18 (2009)). MTI was prepared by methylation of tropine (98%, Alfa Aesar) with iodomethane (99%, Sigma-Aldrich). For this reaction, 200 mL of ethanol was first poured into a 500 mL round-bottom flask connected to a reflux condenser. Then, 50 g of tropine was dissolved in ethanol while stirring with a magnetic bar. Prior to the reaction, the flask was wrapped with aluminum foil to provide a dark environment, and argon was supplied to the flask to ensure an inert environment. Then, 51 g of iodomethane was added dropwise to the flask while stirring with a magnetic bar. After completion of addition, the reaction was carried out at room temperature for 3 days. During the reaction, the solution was continuously stirred using a magnetic bar and the flask was sealed with Teflon tape to maintain the inert conditions. The resulting product was obtained as a white powder, filtered by vacuum filtration and washed with a large amount of ethanol to obtain a highly pure product. The recovered solid powder was further dried in an oven at 70° C. for about 1 day prior to use.

Secondary Growth of ZSM-58 (DDR) Zeolite on SSZ-13 (CHA) Seed Layer

Secondary growth of the SSZ-13 (CHA-type zeolite) seed layer was performed with the synthesis solution for inducing the synthesis of all-silica ZSM-58 (DDR-type zeolite). First, MTI was dissolved in distilled water. For homogenization, a polypropylene bottle was sonicated for 20 minutes. Then, a silica raw material (LUDOX® HS-40 colloidal silica, 40 wt % suspension in $H_2O$, Sigma-Aldrich) was quickly added to the MTI solution dissolved in water. The solution was thoroughly mixed in a mixer for 12 hours. For convenience, this solution is called "solution A". At the same time, a predetermined amount of sodium hydroxide (=98% pellet, Sigma-Aldrich) was dissolved in distilled water and further mixed with a shaking box for about 12 hours. This solution is called "solution B". The prepared solutions A and B were mixed and then allowed to stand in the shaking box for an additional period of approximately 12 hours until the opaque mixture observed immediately after mixing became a clear solution. The final molar composition of the synthetic solution was 70 $SiO_2$: 23 NaOH: 17.5 MTI: 2800 $H_2O$. The molar ratio of distilled water to the synthetic solution of ZSM-58 (DDR-type zeolite) is solution A:solution B of 1:4. About 30 mL of the prepared synthetic solution was poured into a Teflon liner (45 mL) containing an α-$Al_2O_3$ disc coated with seed particles. The seed-coated surface of the α-Al$_2$O$_3$ disc was directed downwards at an incline using a Teflon holder. The Teflon liner containing the disc was placed in a stainless-steel autoclave and the autoclave was transferred to an oven preheated to 130° C. The reaction was carried out under static conditions. The hydrothermal secondary growth process was performed for different periods of time (4, 6, 8, 10 and 12 days respectively). After completion of the reaction, the autoclave was removed and rapidly cooled with tap water. The disc sample was taken out and then the synthesized membrane was washed with a sufficient amount of distilled water and further dried in an oven (HYSC, DO-42) at 100° C. Finally, the dried membrane sample was thermally activated by performing calcination at 550° C. in a furnace at an air flow rate of 200 mL·min$^{-1}$ for 12 hours. For calcination, a slow calcination program at a temperature ramp rate of 0.2° C.·min$^{-1}$ was used, which was selected to minimize the formation of defects in the membrane sample. For convenience, the calcined zeolite membrane is referred to as "DDR@CHA_xd", wherein CHA represents an SSZ-13 seed layer, DDR represents a ZSM-58 part after secondary growth, and x represents a hydrothermal secondary growth time (days).

Secondary Growth of DDR Seed Layer Using CHA Zeolite Synthesis Solution

Figure 11A:
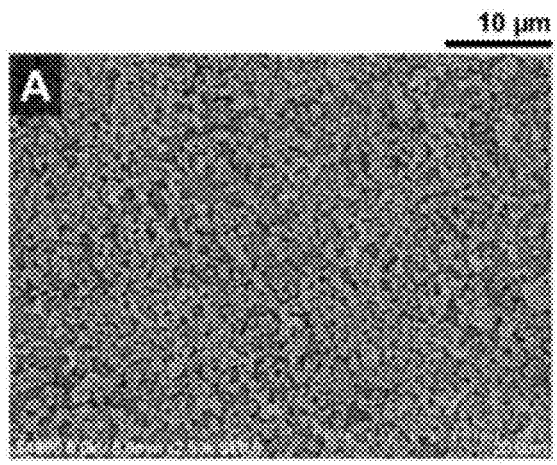
FIG. 11A to FIG. 11E show the results of SEM and XRD of a DDR seed layer according to an embodiment of the present invention and the DDR seed layer obtained through the heterogeneous epitaxial growth using a CHA synthetic solution.
Figure 11B:
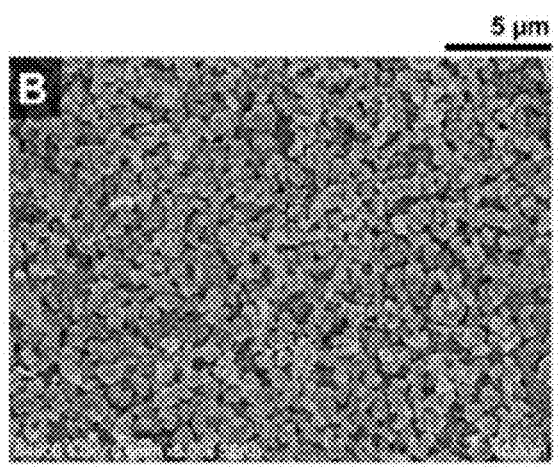
Figure 11C:
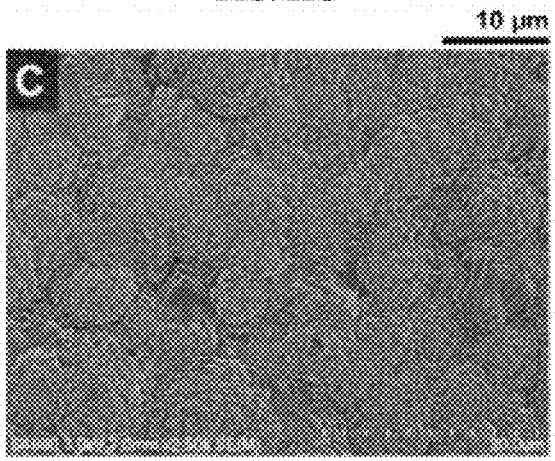
Figure 11D:
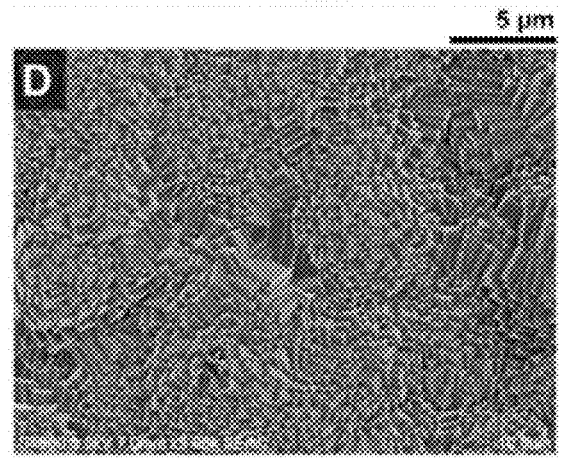
Figure 11E:
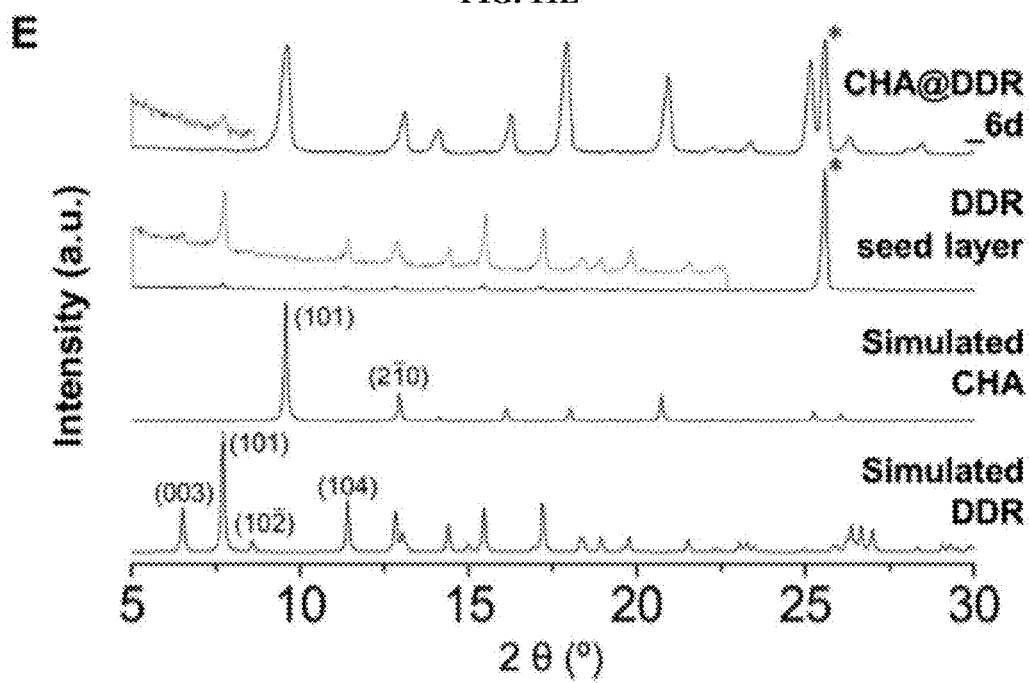

The scanning electron microscope images in FIGS. 11A and 11B show that the DDR seed layer was uniformly formed. In accordance with the previously reported method, diamond-shaped all-silica DDR particles with a size of 820±150 nm were synthesized and deposited on an α-Al$_2$O$_3$ disc (E. Kim et al., *J. Mater. Chem. A* 5, 11246-11254 (2017)). The XRD pattern corresponding to the DDR seed layer of FIG. 11E showed that the formed seed layer had a pure DDR zeolite phase. In addition, SEM images and XRD patterns of the DDR seed layer after secondary growth using the SSZ-13 synthetic solution for 6 days are shown in C and E of FIG. 11. The final molar composition of the SSZ-13 (Si/Al=20) synthetic solution used for the secondary growth of the DDR seed layer was 20 NaOH: 5 Al(OH)$_3$: 100 SiO$_2$: 20 TMAdaOH: 8800 H$_2$O, and the hydrothermal reaction was performed at 160° C. for 6 days. After completion of the reaction, the membrane sample was calcined at 550° C. with a ramp rate of 0.2° C.·min$^{-1}$ in a furnace having an air flow rate of 200 mL·min$^{-1}$ for 12 hours. Scanning electron microscope images show that the SSZ-13 membrane formed a continuous layer on the DDR seed layer (FIGS. 11C and 11D). In addition, XRD peaks corresponding to CHA zeolites appear clearly in the XRD pattern after hydrothermal reaction for 6 days (FIG. 11E). The XRD pattern of the CHA@DDR membrane still includes the (101) peak of the XRD pattern of the DDR seed layer in the XRD pattern extended in the 2Θ range from 5° to 8.5°.

Example 1: Determination of Characteristics of Heterogeneous Zeolite Membrane

Scanning electron microscopy (SEM) images were obtained from Pt-coated samples using field-emission scanning electron microscopy (FE-SEM, Hitachi S-4300). For Pt coating, the samples were coated with Pt generated at 30 mA for 30 seconds using a Hitachi E-1045 ion sputter. In addition, results of energy-dispersive X-ray spectroscopy (EDX) were obtained using a Hitachi S-4800 FE-SEM. The cross-sectional membrane samples were first produced through a dual beam-focused ion beam (DB-FIB) of a TESCAN LYRA3 XMH SEM, and the samples were coated with a carbon and Pt layer to prevent damage by the beam prior to exposure to the focused ion beam. Then, the focused ion beam using Ga ions was applied to the cross-sectional sample with a thin thickness of 100 nm, which was suitable for transmission electron microscopy (TEM) analysis. Then, a cross-sectional transmission electron microscope image, a scanning electron microscope image, and diffraction patterns of CHA and DDR-type zeolite parts were obtained in a scanning electron microscope microprobe mode using the prepared cross-sectional sample. For this purpose, FEI XFEG-Titan themis Double Cs & Mono. TEM was used. For clarity, when the zone axis and Miller index included double digits, the empty space between the numbers was included. X-ray diffraction (XRD) patterns were obtained through a Rigaku Model D/Max-2500V/PC diffractometer using Cu Kα radiation (λ=0.154 nm). To compare the results of the X-ray diffraction patterns, simulated X-ray diffraction patterns of all-silica CHA and DDR zeolites were obtained through crystal information files (CIFs) through Mercury software (Cambridge Crystallographic Data Centre; CCDC). Crystal information files for all-silica CHA and DDR zeolites were downloaded from the International Zeolite Association (IZA) website (http://www.iza-online.org). The crystallographic preferential orientation (CPO) value was obtained by analyzing the X-ray diffraction pattern in accordance with a previously described method (E. Kim et al., *Angew. Chem. Int. Edit.* 52, 5280-5284 (2013)). In addition, in order to evaluate the hydrophobicity of the membrane sample, the contact angle of water droplets on the surface of the separator was measured using an SEO phoenix-300 contact angle analyzer.

The separation performance of the DDR@CHA membrane was tested in a Wicke-Kallenbach mode, wherein the total pressure in the feed and permeation areas was maintained at 1 atm. In the feed area, the partial pressure of the two mixtures of $CO_2:N_2$ or $CO_2:CH_4$ is 50.5 kPa: 50.5 kPa under dry conditions (referred to as dry $CO_2:N_2$=50:50 or dry $CO_2:CH_4$=50:50). In addition, under wet conditions, 3 kPa of water vapor was added, so that the partial pressure of the two mixtures of $CO_2:N_2$ or $CO_2:CH_4$ were 49 kPa (referred to as wet $CO_2:N_2$=50:50 or wet $CO_2:CH_4$=50:50). Moreover, the partial pressure of simulated flue-gas of power plants that burn fossil fuels (T. C. Merkel et al., *J. Membr. Sci.* 359, 126-139 (2010); D. Singh et al., *Energy Convers. Manag.* 44, 3073-3091 (2003); D. M. D'Alessandro et al., *Angew. Chem. Int. Edit.* 49, 6058-6082 (2010)) was set at 15.2 kPa $CO_2$: 85.8 kPa $N_2$ under dry conditions (referred to as "dry $CO_2:N_2$=15:85") and was set to 14.7 kPa $CO_2$:83.3 kPa $N_2$: 3 kPa $H_2O$ vapor (referred to as "wet $CO_2:N_2$=15:85") under wet conditions. Finally, 5 kPa $CO_2$: 96 kPa $N_2$ under dry conditions (referred to as "dry $CO_2:N_2$=5:95") and 4.9 kPa $CO_2$: 93.1 kPa $N_2$: 3 kPa $H_2O$ vapor (referred to as "wet $CO_2:N_2$=5:95") were used in the feed gas mixture, which was used to simulate the composition of flue gases in gas-burning power plants (M. Mofarahi et al., *Energy* 33, 1311-1319 (2008); X. C. Xu et al., *Fuel Process. Technol.* 86, 1457-1472 (2005); M. Halmann et al., *Energy* 31, 3171-3185 (2006); O. Bolland et al., *Energy Convers. Manag.* 33, 467-475 (1992)). The total flow rate of the feed gas and the sweep gas was adjusted to 100 mL·min$^{-1}$. In the permeation part, the permeated gas was continuously swept by the sweep gas so that $CO_2/N_2$ was transferred to a thermal conductivity detector (TCD) and $CO_2/CH_4$ was transferred to a gas chromatograph (GC; $CO_2/N_2$ analysis was carried out using a Young Lin (YL) 6100 GC system and $CO_2/CH_4$ analysis was carried out using a YL 6500 GC system) equipped with a pulsed discharge ionization detector (PDD). In particular, methane and hydrogen (~5 mL·min$^{-1}$) were added to the sweep flow of the permeate gas, which was used as an internal standard to reliably calculate the permeance rate of the $CO_2/N_2$ and $CO_2/CH_4$ mixtures.

Fluorescent confocal optical microscopy (FCOM) (G. Bonilla et al., *J. Membr. Sci.* 182, 103-109 (2001)) analysis of DDR@CHA_xd using a ZEISS LSM 700 confocal microscope and a solid-state laser (555 nm wavelength) was used to study the defect structure hidden inside the membrane. A fluorescein sodium salt (Sigma-Aldrich) was used as a staining molecule, and the molecular size thereof was about 1 nm (J. Choi et al., *Science* 325, 590-593 (2009)). For this reason, the pore size (0.36×0.43 $nm^2$) of DDR-type zeolites is smaller than or similar to the size of the defect. Membrane samples were stained while being allowed to stand in contact with a 1 mM fluorescein sodium salt solution to prepare for analysis. In particular, the surface of the membrane was allowed to be in contact with the staining solution for 4 days using an osmosis-type module (T. Lee et al., *J. Membr. Sci.* 436, 79-89 (2013)). After the staining process was completed, FCOM images of the stained DDR@CHA_xd samples were obtained along the film thickness from the membrane surface to the interface between the membrane and the $\alpha$-$Al_2O_3$ support.

Figure 2A:
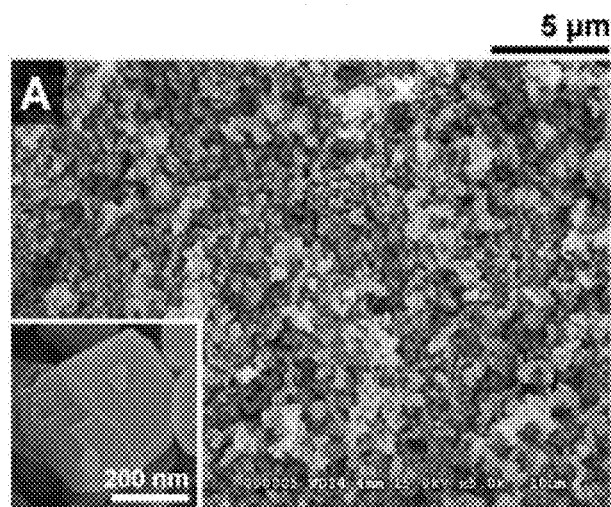
FIG. 2A to FIG. 2I are SEM images and graphs showing a membrane obtained through heterogeneous epitaxial growth as a continuous membrane with a seed layer in the membrane according to an embodiment of the present invention.
Figure 2B:
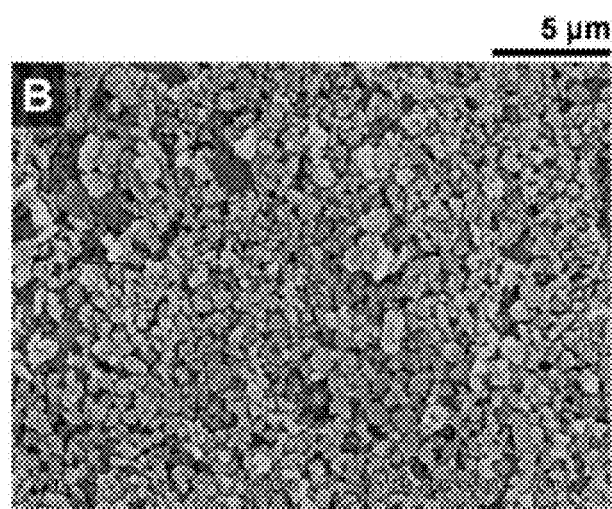
Figure 2C:
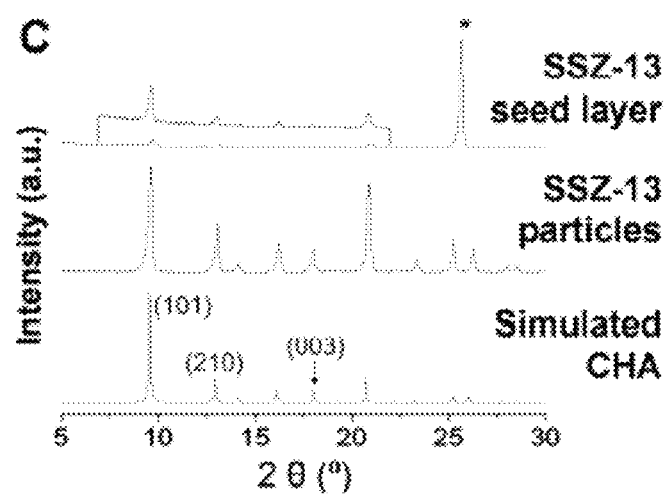
Figure 2D:
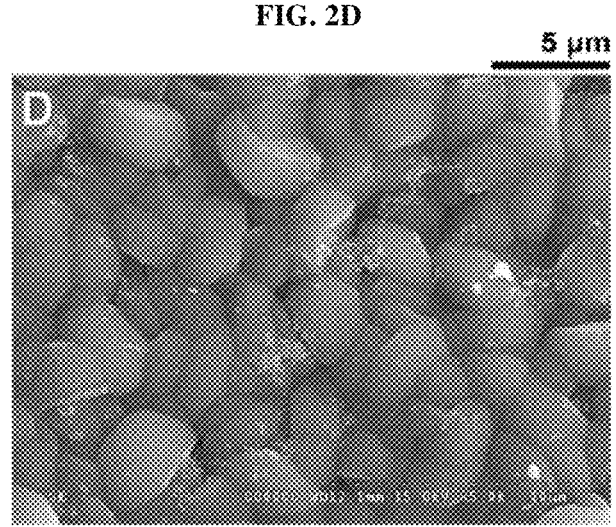
Figure 2E:
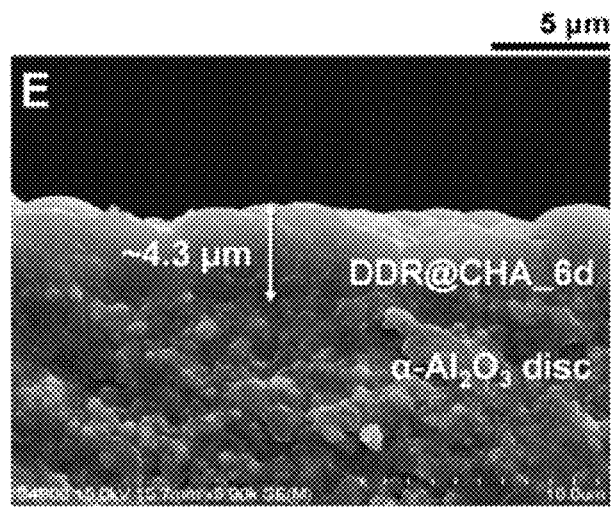
Figure 2F:
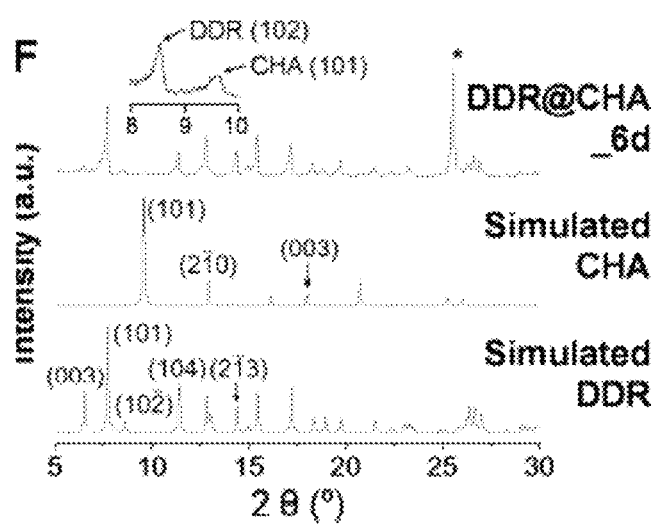
Figure 2G:
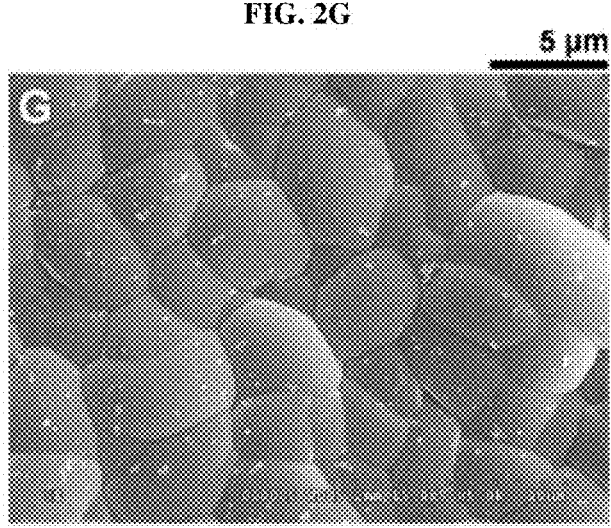
Figure 2H:
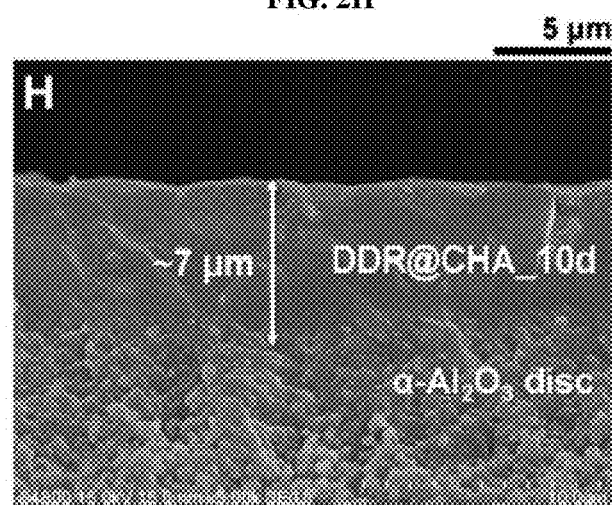
Figure 2I:
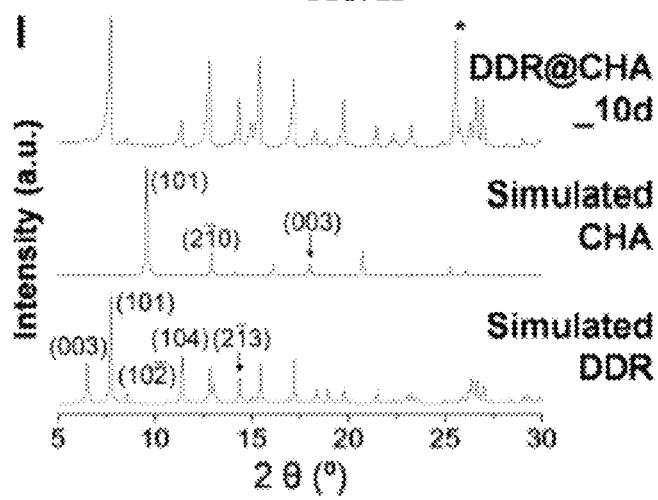
Figure 7:
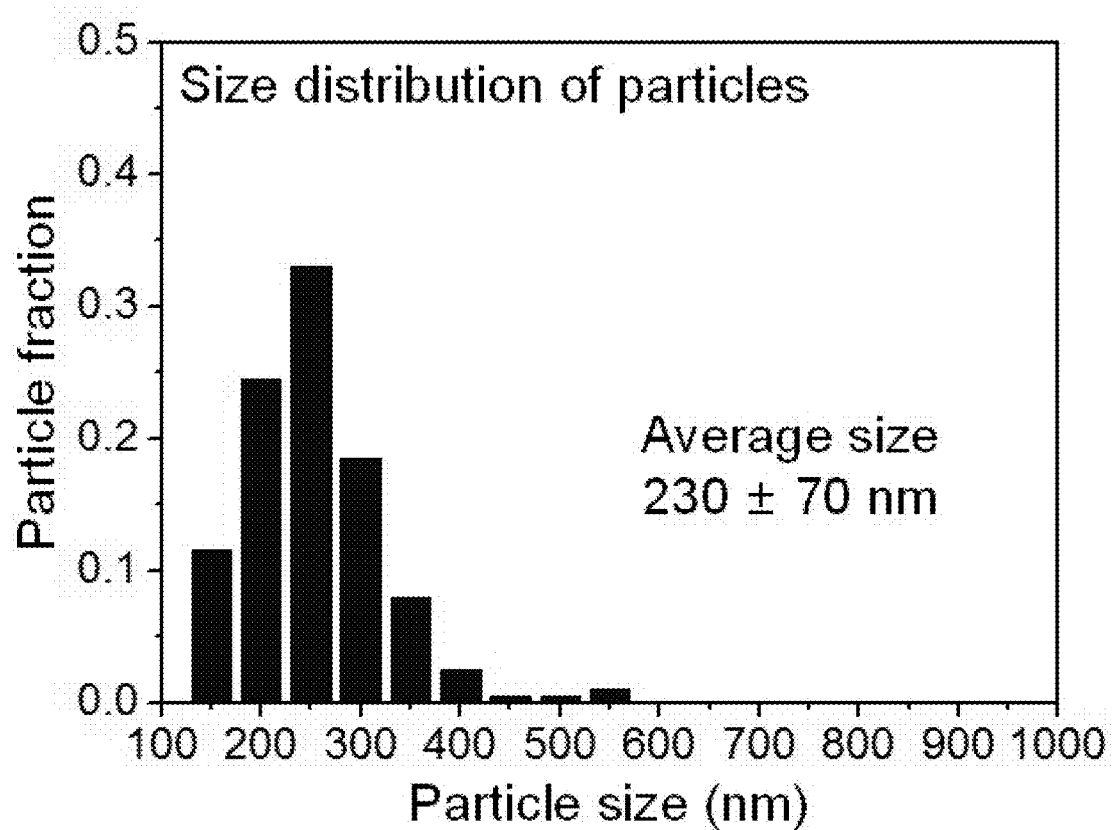
FIG. 7 is a graph showing the size distribution of SSZ-13 (CHA type zeolite) seed particles used for the formation of a seed layer according to an embodiment of the present invention.
Figure 8A:
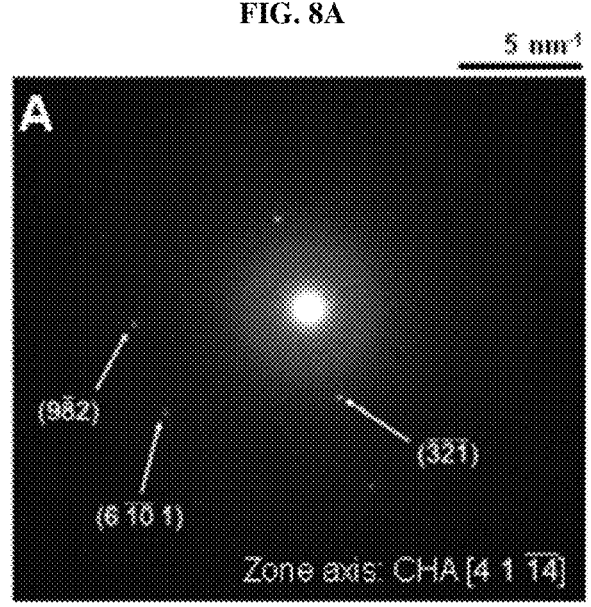
FIG. 8A to FIG. 8D are images showing electron diffraction patterns and simulation patterns of the zeolite membrane obtained through heterogeneous epitaxial growth according to an embodiment of the present invention.
Figure 8B:
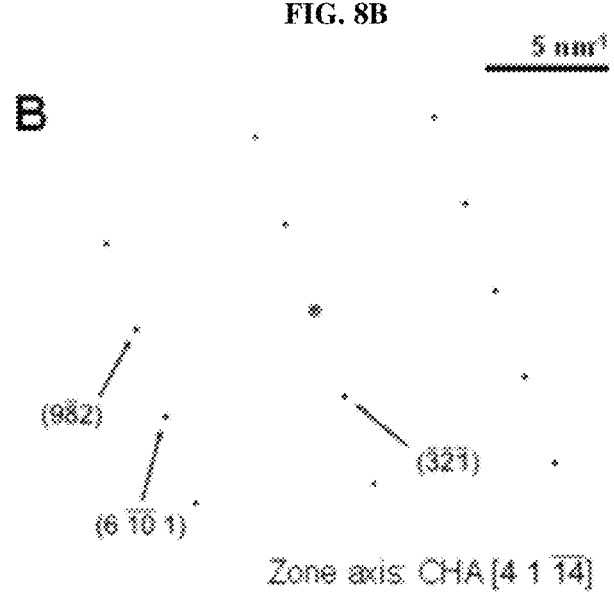
Figure 8C:
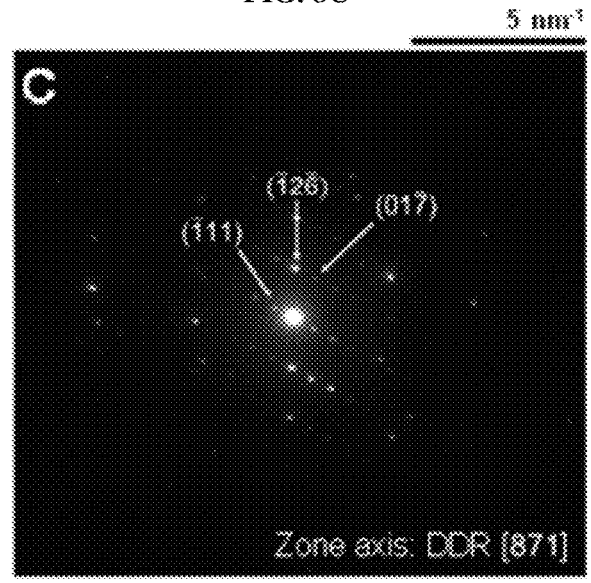
Figure 8D:
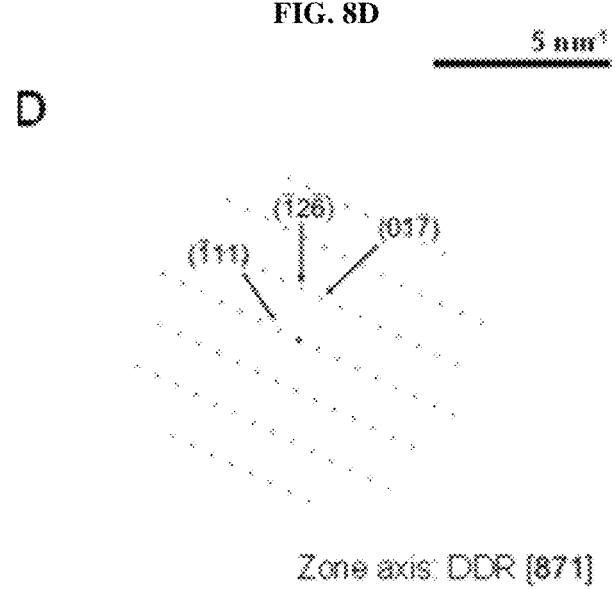

FIG. 2A shows a scanning electron microscope (SEM) image of the particles, which were synthesized such that the Si/Al ratio thereof was adjusted to ~20. The average size of these particles is 230±70 nm (FIG. 7), which is very suitable for use as seed particles on a porous support. The particles synthesized shown in FIG. 2C in the X-ray diffraction (XRD) patterns were found to be in a CHA zeolite phase known as standard oil synthetic zeolite-13 (SSZ-13). FIG. 2B shows that the SSZ-13 particles are dense and well dispersed on the porous $\alpha$-$Al_2O_3$ disc surface to form a uniform SSZ-13 seed layer. The XRD pattern corresponding to the SSZ-13 seed layer in FIG. 2C shows that a uniform layer of highly pure and crystalline SSZ-13 particles was formed on the $\alpha$-$Al_2O_3$ disc. For convenience, the membrane grown by heterogeneous epitaxial growth is referred to as "DDR@CHA_xd", wherein CHA represents a SSZ-13 seed layer, DDR represents a ZSM-58 part after secondary growth, and finally, x represents the secondary growth time of the hydrothermal reaction. FIGS. 2D and 2E show hydrothermal growth (i.e., DDR@CHA_6d) for 6 days in the seed layer shown in FIG. 2B with the synthetic solution enabling the synthesis of ZSM-58 (DDR-type zeolite), causing the SSZ-13 seed layer to be effectively covered due to the structural similarity with the DDR-type zeolite. The XRD pattern of FIG. 2E showed that the SSZ-13 seed layer and the DDR structure part co-exist in a lower part and an upper part, respectively, of a membrane having a thickness of several micrometers (~4.3 µm). It can be seen that the heterogeneous zeolite membrane was formed after secondary growth of the SSZ-13 (CHA-type zeolite) layer using the ZSM-58 (DDR-type zeolite) synthetic solution. Furthermore, FIGS. 2G and 2H show that a continuous membrane having an increased total thickness of 7 µm (FIG. 2H) was formed after increasing the hydrothermal growth time to 10 days, resulting in an increase in the DDR structure part of DDR@CHA_10d. Since the main part is the DDR ingredient or grain, almost no XRD peak corresponding to the SSZ-13 layer of DDR@CHA_10d seems to appear (FIG. 2I), which means that the SSZ-13 layer is well contained inside the membrane and is difficult to detect.

Figure 3A:
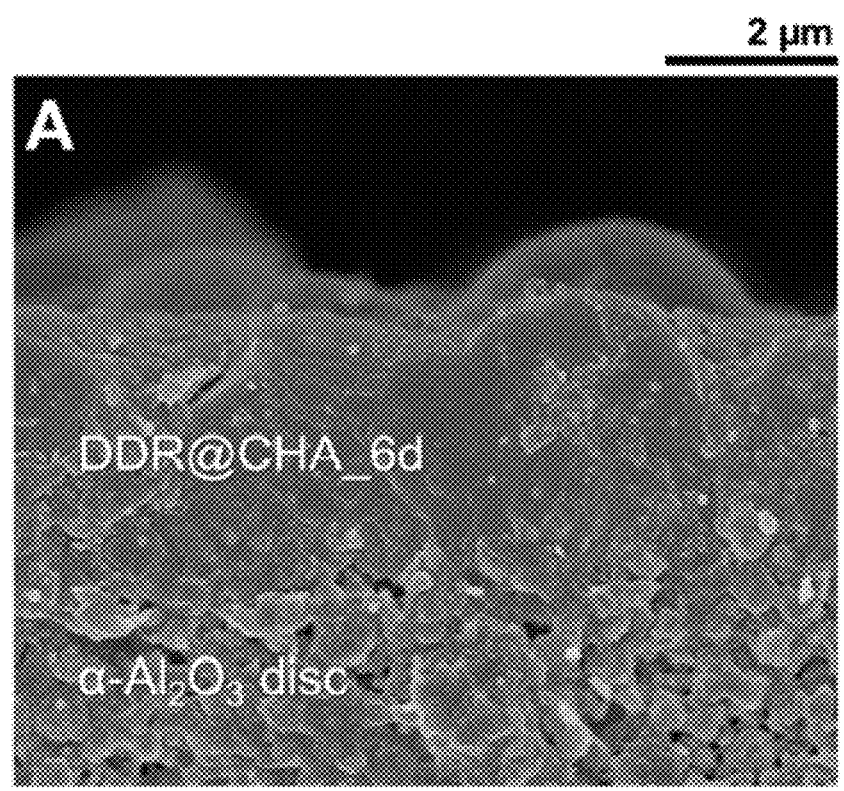
FIG. 3A to FIG. 3F are images showing CHA and DDR zeolites identified in a zeolite membrane obtained through heterogeneous epitaxial growth according to an embodiment of the present invention.
Figure 3B:
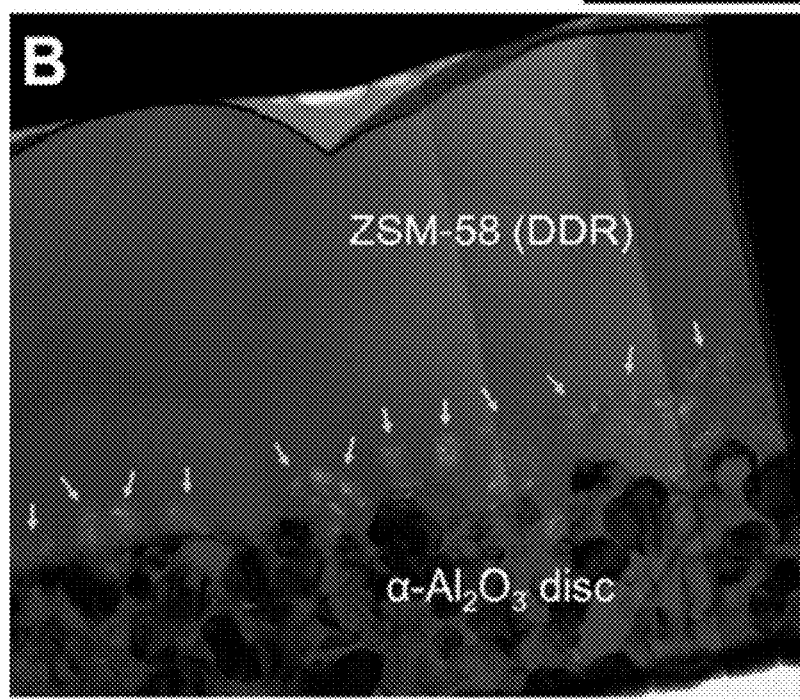
Figure 3C:
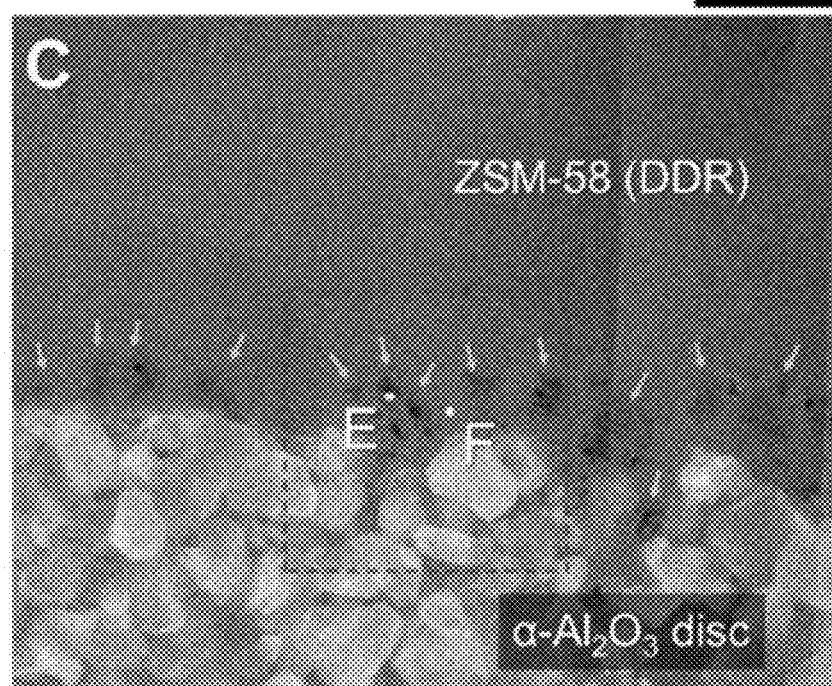
Figure 3D:
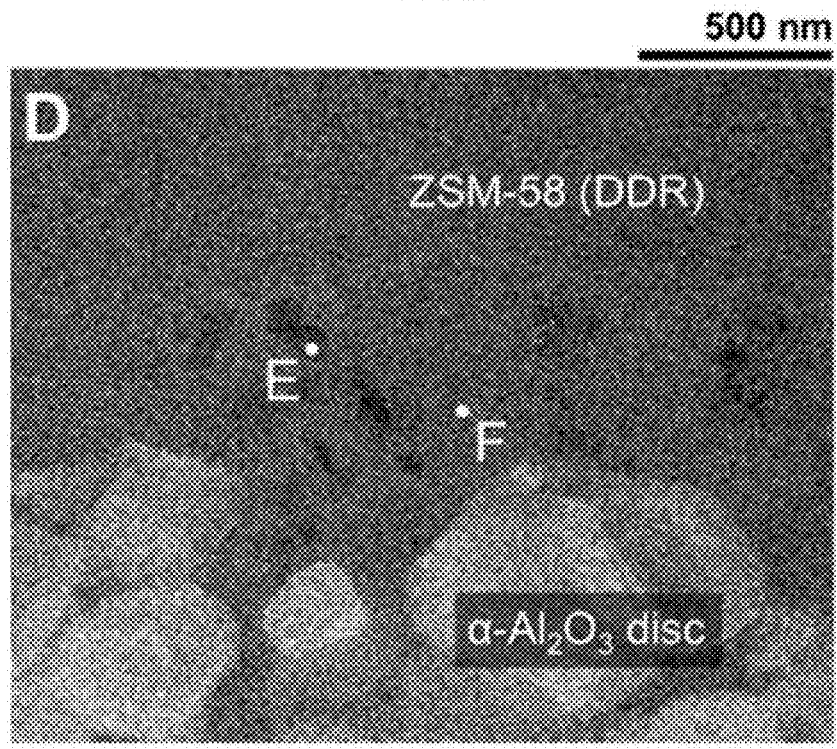
Figure 3E:
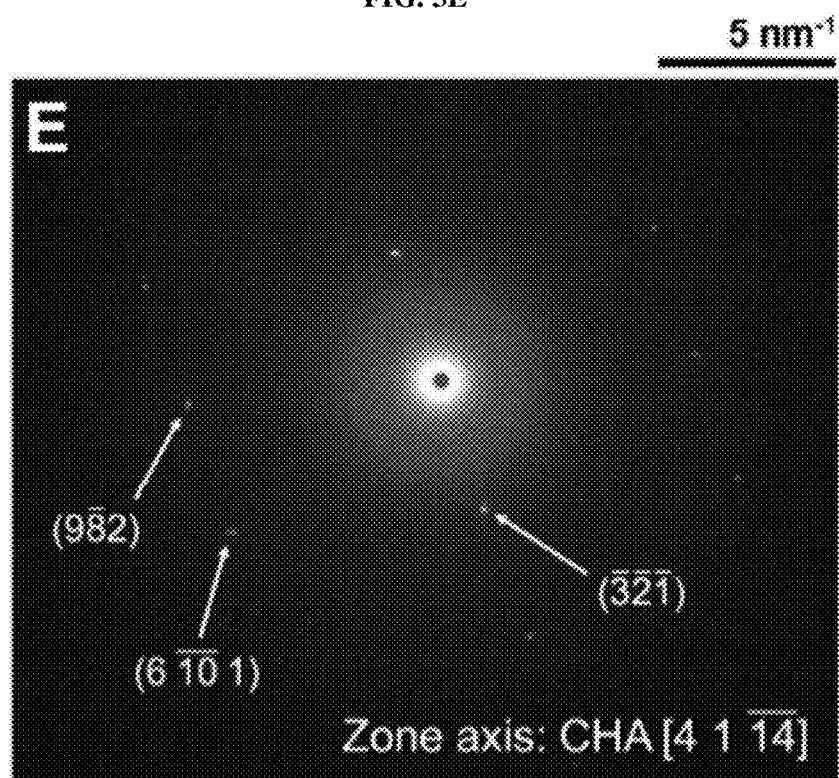
Figure 3F:
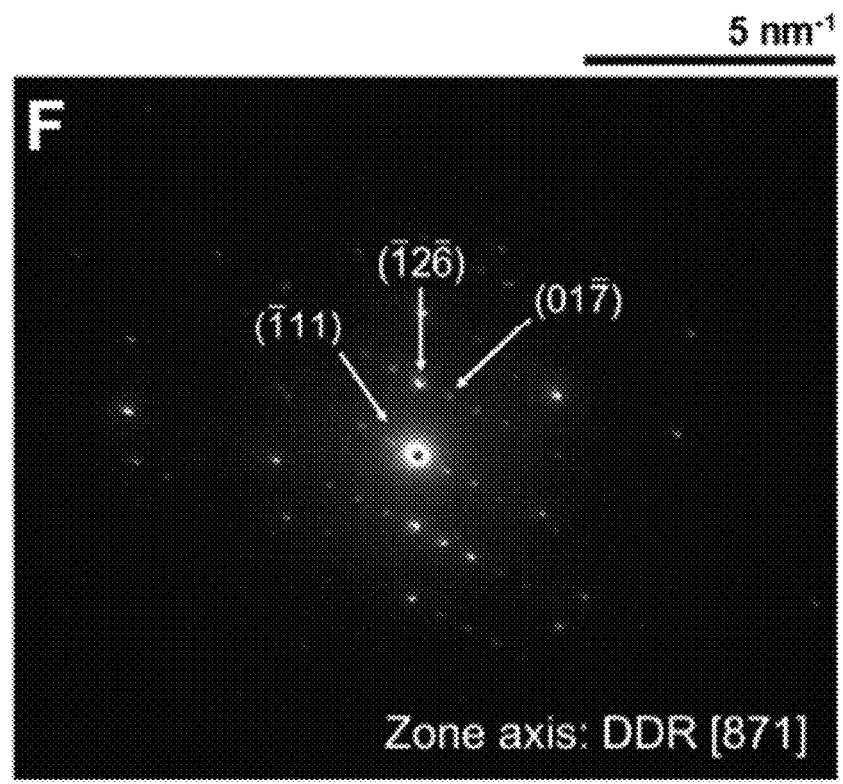
Figure 9A:
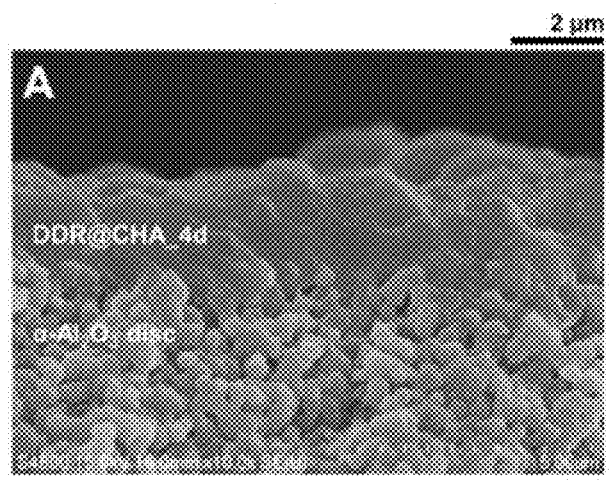
FIG. 9A to FIG. 9D are images showing CHA and DDR zeolite identified in DDR@CHA_4d according to an embodiment of the present invention.
Figure 9B:
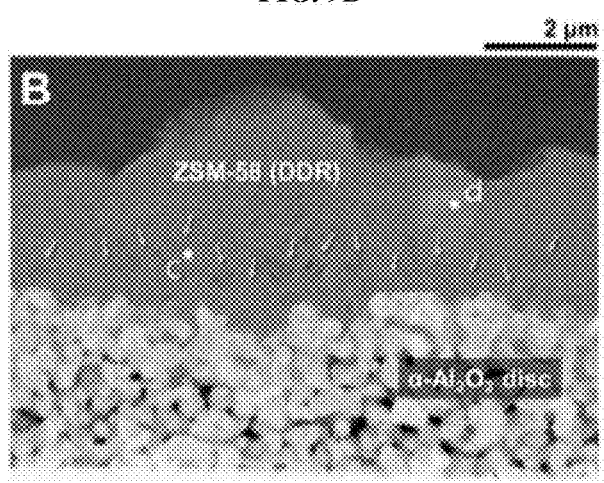
Figure 9C:
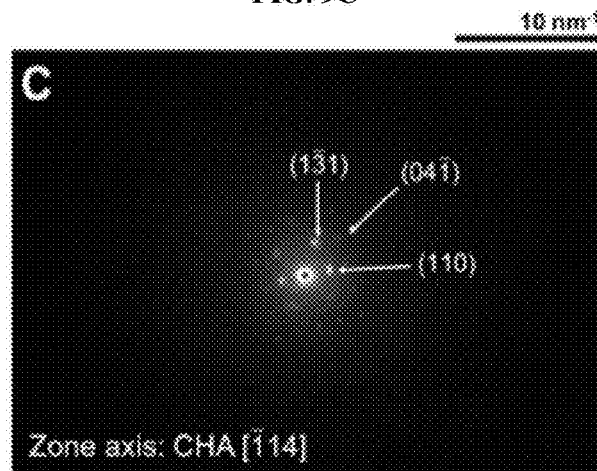
Figure 9D:
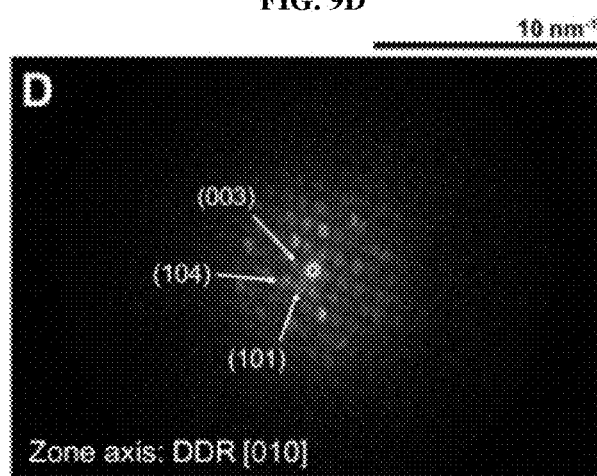

How well the ZSM-58 zeolite structurally bonded with the SSZ-13 seed layer was identified in order to form a continuous composite membrane. In particular, emphasis was placed on investigating compatibility through TEM-based visualization of the interface between the ZSM-58 grains and the SSZ-13 seed layer, and the adjacent area thereof. STEM images of FIGS. 2C and 2D and TEM images of FIG. 3B were obtained using the cross-sectional DDR@CHA_6d of the high-magnification SEM image shown in FIG. 3A. Dots having different contrasts (220±60 nm, calculated from 21 dark dots in FIG. 3C) indicated by orange arrows at the bottom of the membrane in FIGS. 3B and 3C are easily observed throughout the cross-sectional image. The location thereof close to the $\alpha$-$Al_2O_3$ disc indicates that these dots are related to SSZ-13 seed particles having a size of 230 nm. Irregular but spherical shapes of these dots having different contrasts are identical to those of the seed particles, as shown in FIGS. 2A and 2B. Subsequently, diffraction patterns were obtained from the region represented by "E" in one dark dot (presumably related to SSZ-13 seed particles) in FIG. 3D and the region represented by "F" between the dark dots (presumably associated with heterogeneously grown DDR grains to distinguish the CHA and DDR zeolite regions in DDR@CHA_6d). The resulting diffraction patterns along with the corresponding simulated pattern (represented by red dots) are shown in FIGS. 3E and 3F. It was found that the diffraction pattern of FIG. 3E corresponds very well to the simulated diffraction pattern following the CHA zeolite having a [4 1 $\overline{14}$] zone axis. Similarly, the diffraction pattern of FIG. 3F corresponds well to the simulated diffraction pattern corresponding to the DDR zeolite having a [871] zone axis. More particularly, the simulated diffraction pattern for the [4 1 $\overline{14}$] zone axis of the CHA zeolite and the [871] zone axis of the DDR zeolite are shown adjacent to the diffraction pattern obtained through the experiment of FIG. 9. This TEM-based analysis shows that the DDR@CHA membrane has two heterogeneous crystal structures (DDR as a main part and CHA as a seed layer), and thus the DDR@CHA membrane is formed through mutual growth between SSZ-13 particles along with the DDR phase. Similarly, the STEM image of DDR@CHA_4d (see the cross-sectional SEM image of FIG. 9A), which could not be grown significantly due to the short growth time, also included the dark dots mentioned above (FIG. 4B). In addition, the structural analysis of the electron diffraction pattern supported the coexistence of CHA and DDR zeolite phases inside DDR@CHA_4d (FIGS. 9C and 9D).

Figure 10:
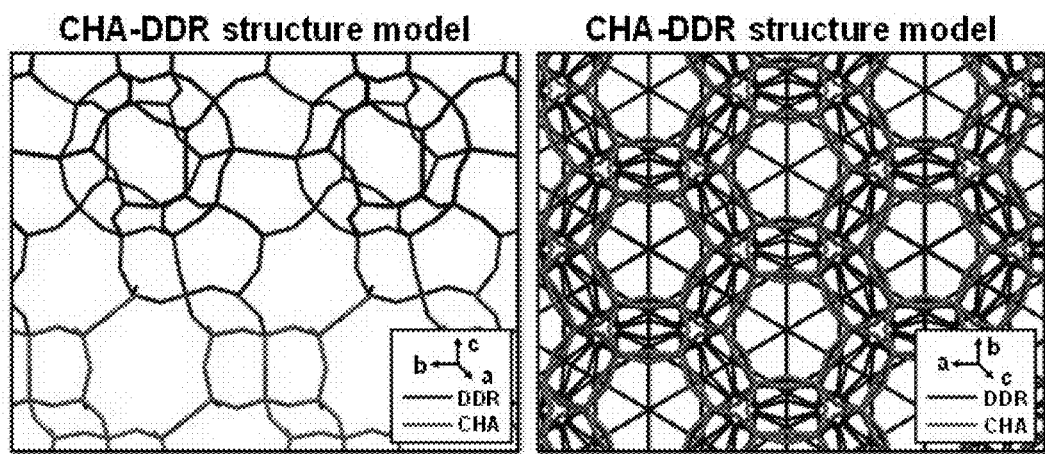
FIG. 10 is a schematic structural model of DDR type zeolite that can be epitaxially grown from CHA-type zeolite at an interface according to an embodiment of the present invention.
Figure 12A:
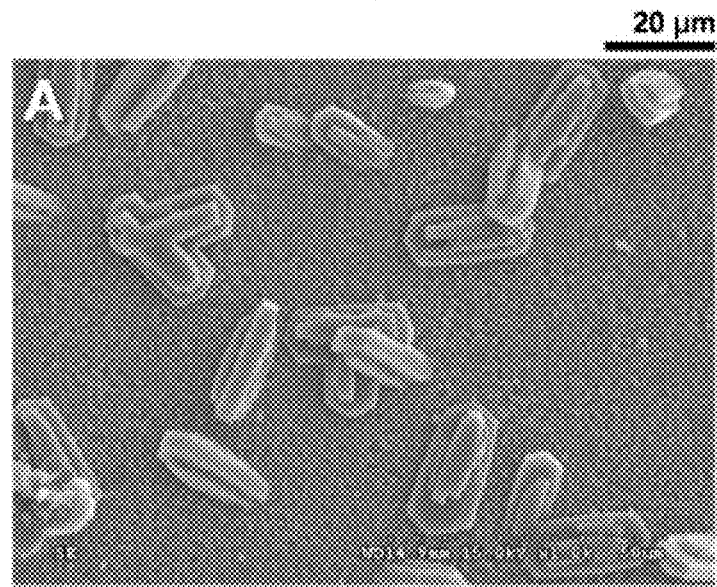
FIG. 12A to FIG. 12C show the results of SEM and XRD of the membrane grown from the SSZ-13 seed layer with a MFI synthetic solution according to an embodiment of the present invention.
Figure 12B:
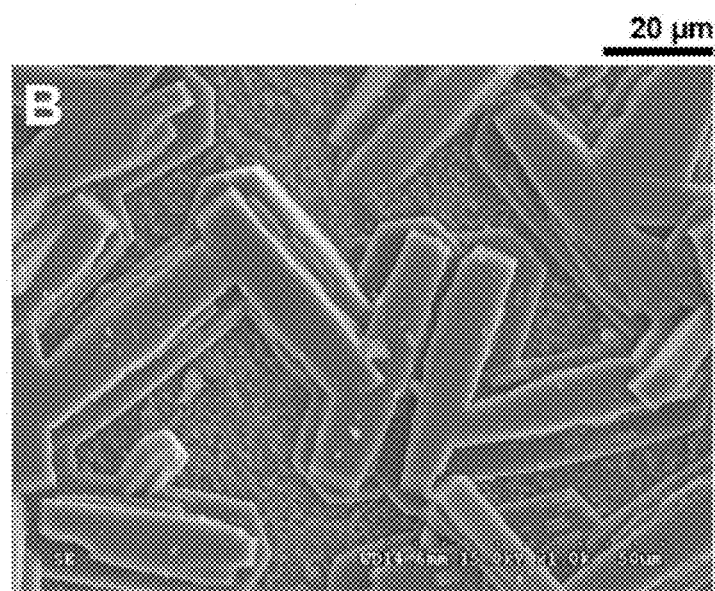
Figure 12C:
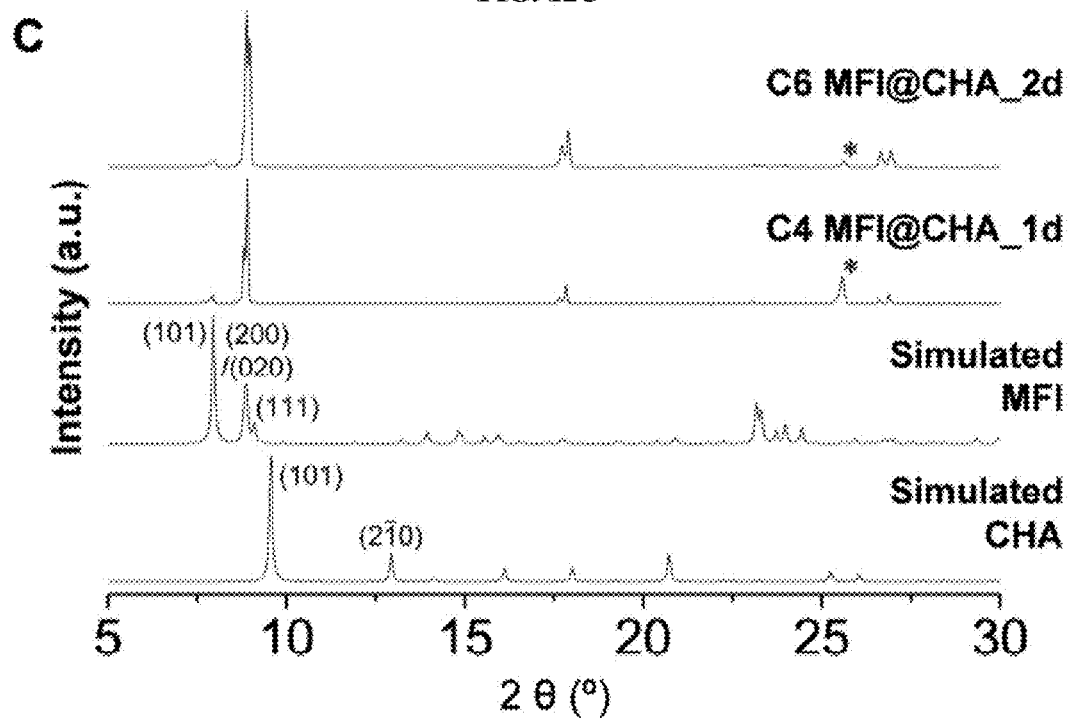
Figure 13A:
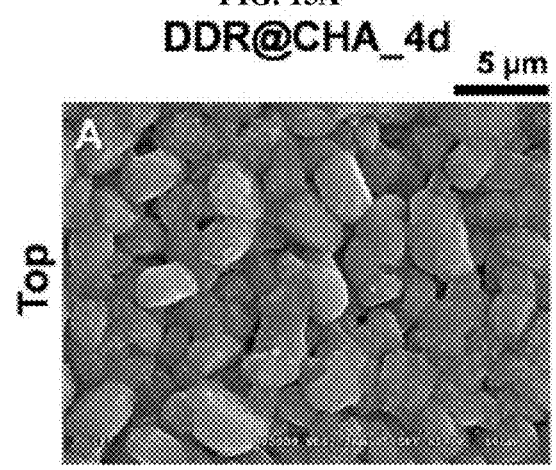
FIG. 13A to FIG. 13O are images showing the surface morphology, chemical composition and hydrophobicity of the DDR@CHA membrane series according to an embodiment of the present invention.
Figure 13B:
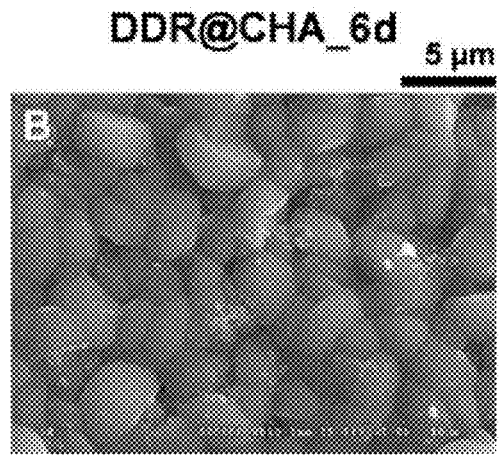
Figure 13C:
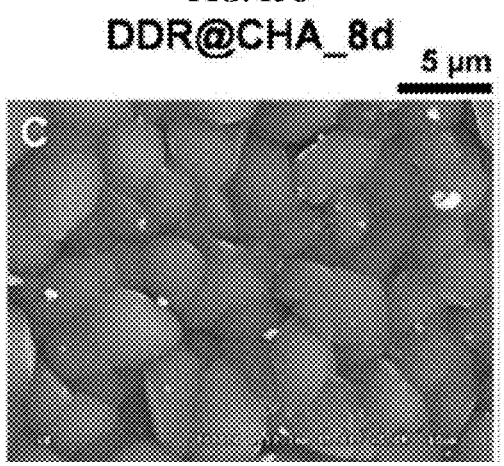
Figure 13D:
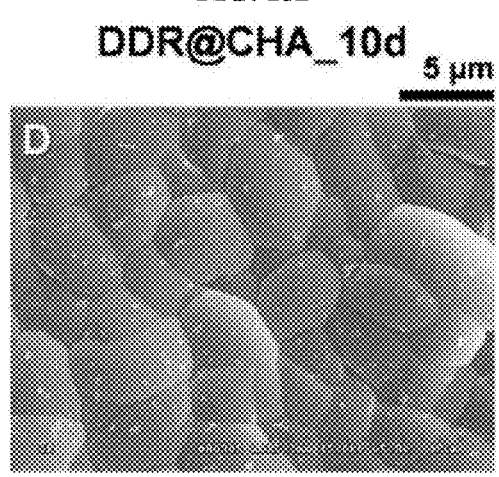
Figure 13E:
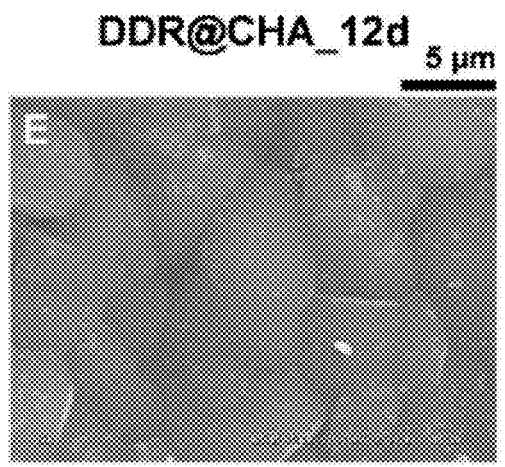
Figure 13F:
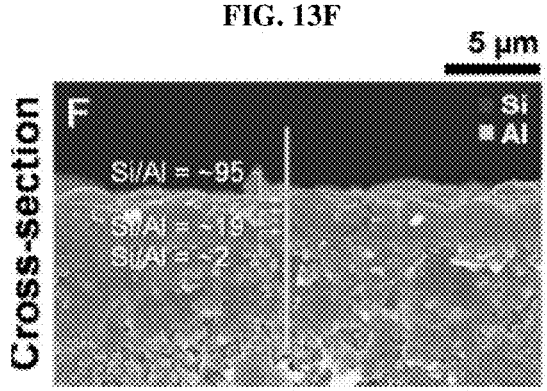
Figure 13G:
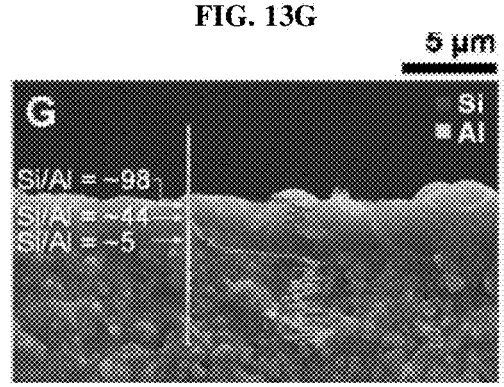
Figure 13H:
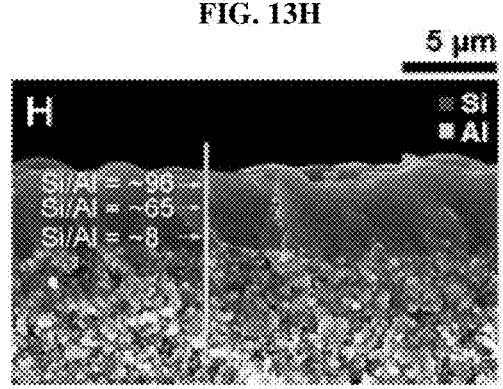
Figure 13I:
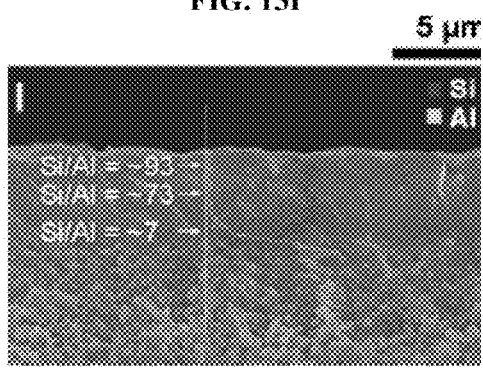
Figure 13J:
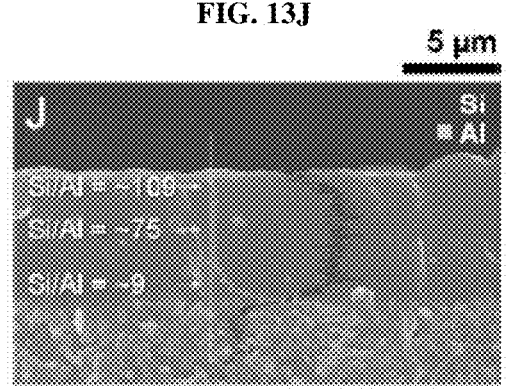
Figure 13K:
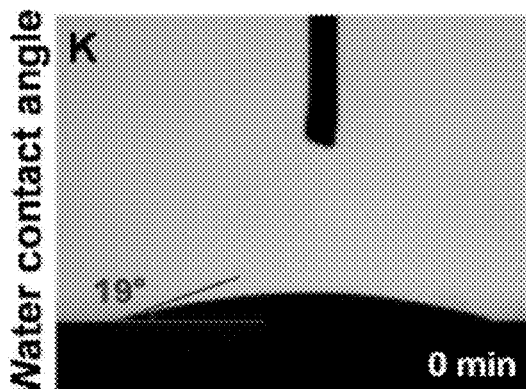
Figure 13L:
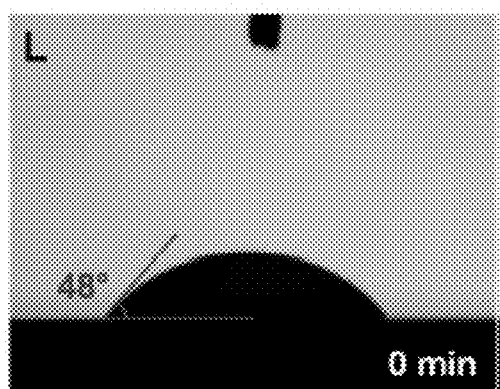
Figure 13M:
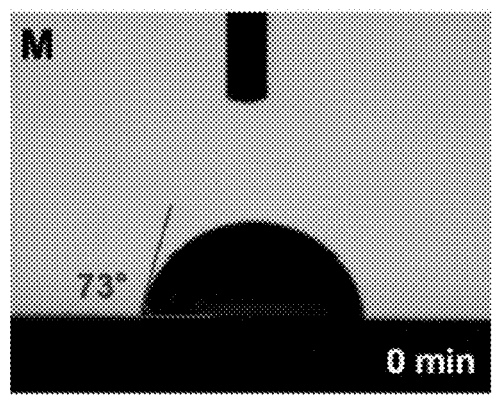
Figure 13N:
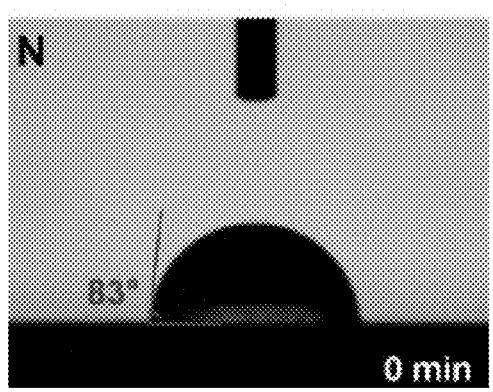
Figure 13O:
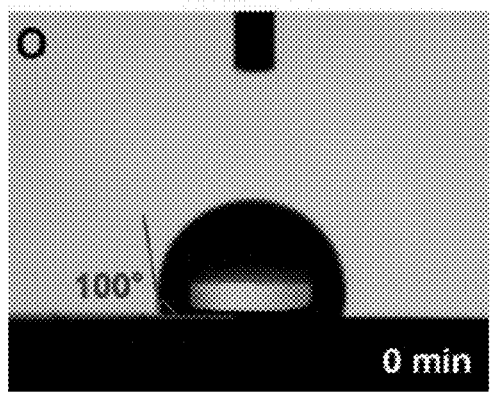
Figure 14:
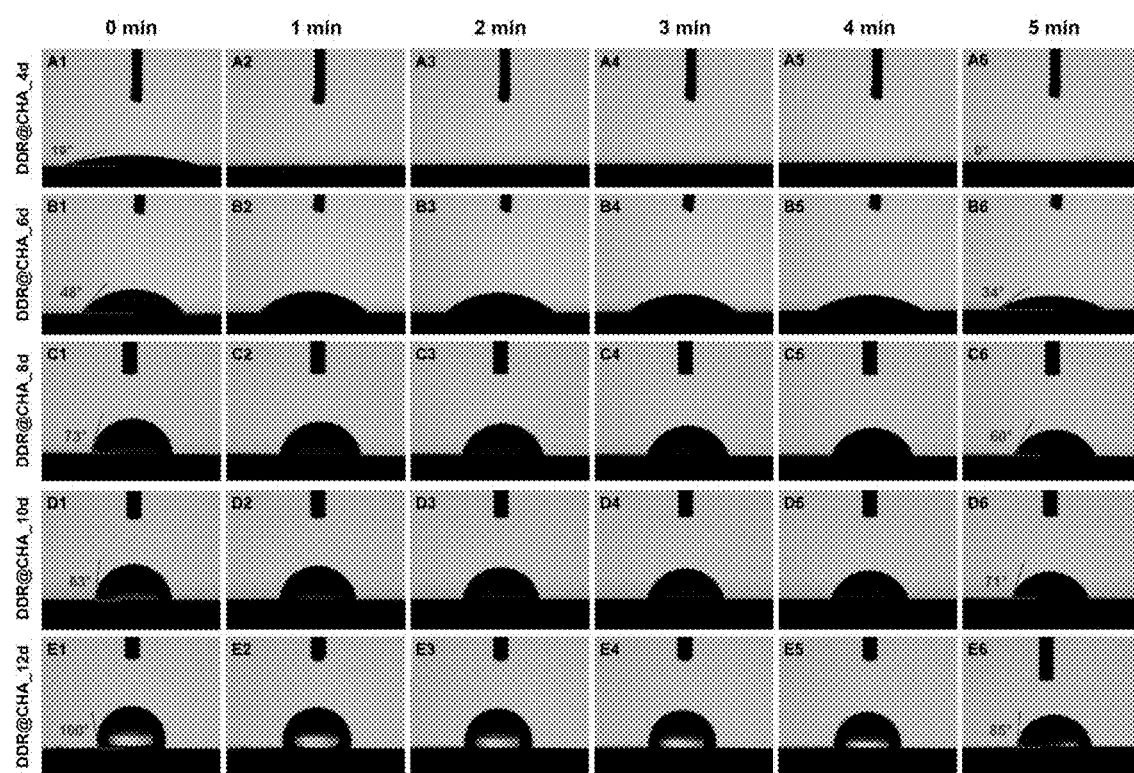
FIG. 14 is an image showing the hydrophobicity of the DDR@CHA membrane series according to an embodiment of the present invention.
Figure 15:
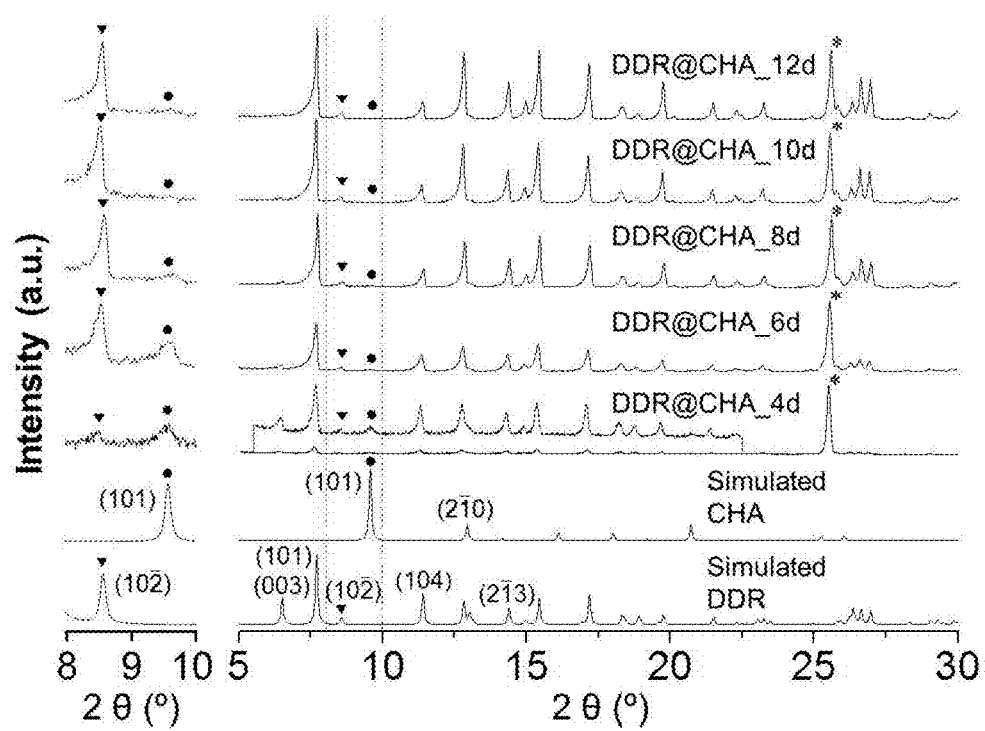
FIG. 15 shows the results of XRD of DDR@CHA membrane series obtained through the heterogeneous epitaxial growth according to an embodiment of the present invention.
Figure 16:
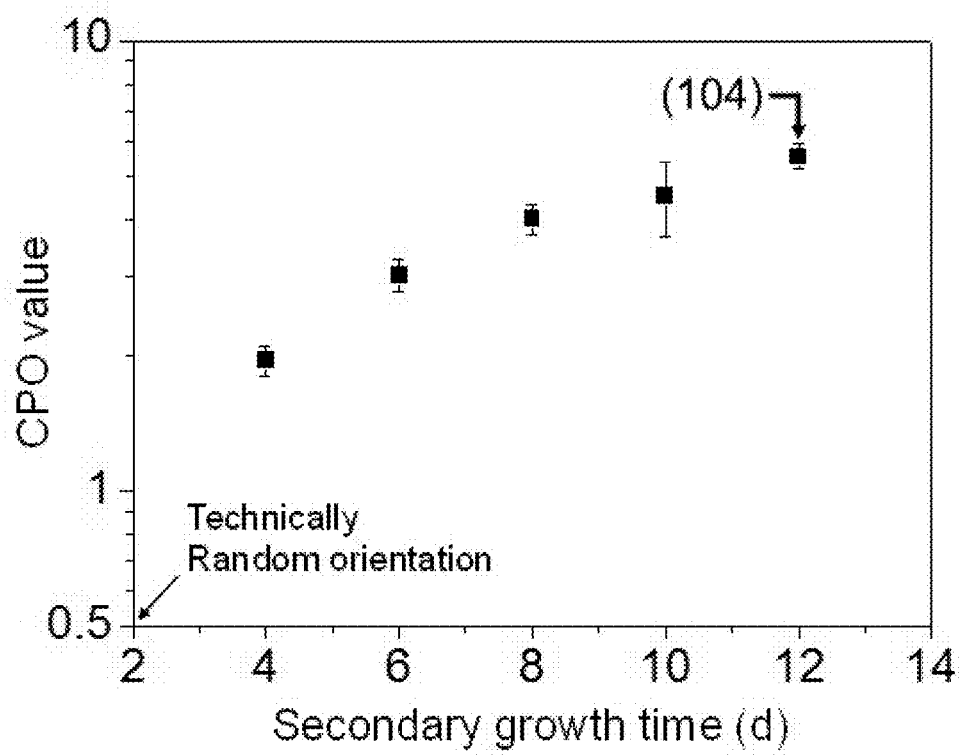
FIG. 16 shows a CPO value of the DDR@CHA membrane depending on secondary growth time according to an embodiment of the present invention.

A valid structural model to explain the heterogeneous epitaxial growth at the interface between CHA- and DDR-type zeolites was proposed based on the heterogeneous epitaxial growth in FIG. 10. Specifically, both CHA and DDR-type zeolites have trigonal crystals of hexagonal crystal family and have a spatial group of R3m ($\alpha$=90°, $\beta$=90°, $\gamma$=1200 along with a=b≠c). In addition, it should be noted that the lengths in a and b directions of unit cells are very similar (CHA zeolite, a: 13.6750 Å, b: 13.6750 Å, c: 14.7670 Å and DDR zeolite, a: 13.7950 Å, b: 13.7950 Å, c: 40.7500 Å). In the case of mutual growth along the c-axis, the structural similarity between CHA and DDR zeolites is considered to be the key to forming DDR zeolites and continuous composite membranes from SSZ-13 seed layers through heterogeneous epitaxial growth. As expected, the synthesis proceeded well in other synthetic directions (i.e., heterogeneous epitaxial growth with the CHA zeolite as a major part, from the DDR seed layer) (FIG. 11). FIG. 12 shows the results of SEM and XRD performed on a membrane grown from the SSZ-13 seed layer along with the MFI synthetic solution. FIGS. 12A and 12B show scanning electron microscope images of $\alpha$-$Al_2O_3$ discs coated with SSZ-13 (CHA type zeolite) seed particles after secondary growth using another MFI synthetic solution, and the final molar compositions and hydrothermal secondary growth conditions were (A) 40 $SiO_2$: 9 TPAOH: 9500 $H_2O$: 160 EtOH for 1 day at 175° C. in the case of C4 MFI@CHA (A. Gouzinis et al., *Chem. Mater.* 10, 2497-2504 (1998)) and (B) 60 $SiO_2$: 9 TPAOH: 9500 $H_2O$: 240 EtOH for 2 days at 175° C. in the case of C6 MFI@CHA (J. Choi et al., *Angew. Chem. Int. Edit.* 45, 1154-1158 (2006)). In addition, the XRD patterns of C4 MFI@CHA and C6 MFI@CHA membranes are shown in (C) along with simulated XRD patterns of all-silica CHA and MFI zeolites. The symbol * represents the XRD peak of the $\alpha$-$Al_2O_3$ disc. However, hydrothermal growth in the SSZ-13 seed layer using the synthetic solution of MFI zeolite does not realize a continuous membrane since there was no structural similarity between the two zeolites (FIG. 12).

The characteristics of the DDR@CHA membrane series (DDR@CHA_xd; x=4, 6, 10, 12) were determined (Table 1, FIGS. 13 to 16). As the secondary growth time increased, the surface of the membrane gradually became denser due to the larger grain size. In addition, as the secondary growth time increased, all membrane properties such as thickness, hydrophobicity and out-of-plane orientation gradually increased.

Example 2: Determination of $CO_2$ Permeance Selectivity of DDR@CHA Membrane

When the $CO_2/N_2$ mixture in the same ratio was supplied under dry conditions from A to E of FIG. 17, the permeance of $CO_2$ and $N_2$ molecules and the corresponding separation factors are shown as a function of temperature. For better comparison, the separation performance of the DDR@CHA membrane series measured at 30° C., where the highest $CO_2/N_2$ separation factor is observed, is shown in FIG. 17F. DDR@ CHA_4d has the low maximum $CO_2/N_2$ separation factor of ~1.1 and thus the lowest separation performance among the DDR@ CHA membrane series. This means that DDR@CHA_4d is not sufficiently intergrown. However, further growth of the membrane caused a monotonous increase in the $CO_2/N_2$ separation factor and provided a peak separation factor after 10 days. Apparently, the membrane growth was nearly saturated after 10 days (which corresponds well to the thickness behavior shown in Table 1).

Figure 4A:
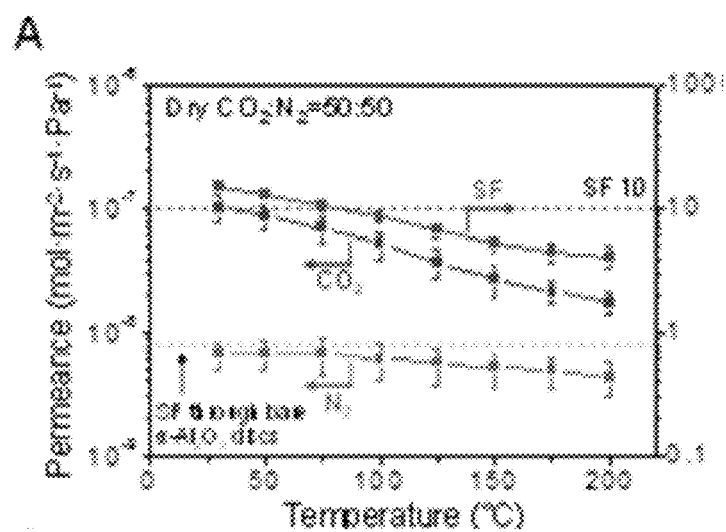
FIG. 4A to FIG. 4F are graphs showing carbon dioxide permeance selectivity and stability of a DDR@CHA membrane obtained through heterogeneous epitaxial growth according to an embodiment of the present invention.
Figure 4B:
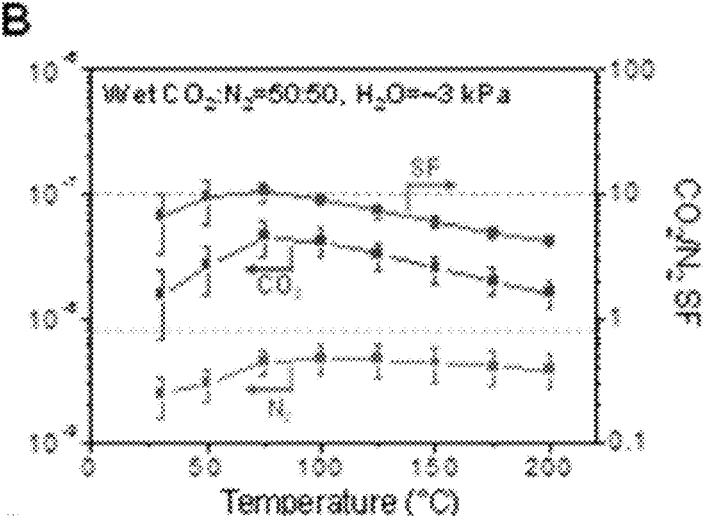
Figure 4C:
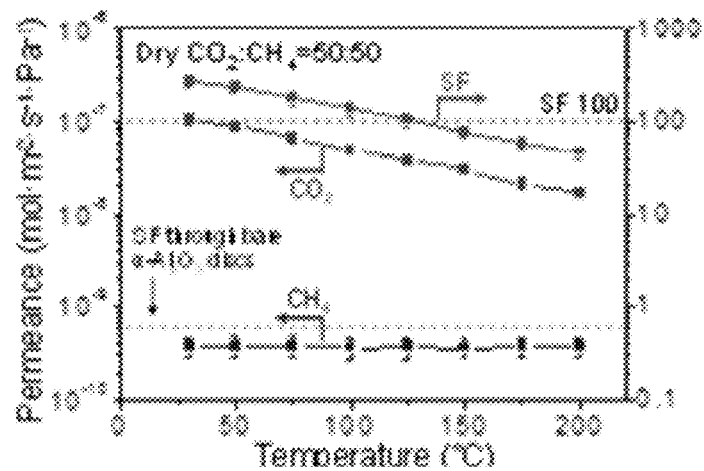
Figure 4D:
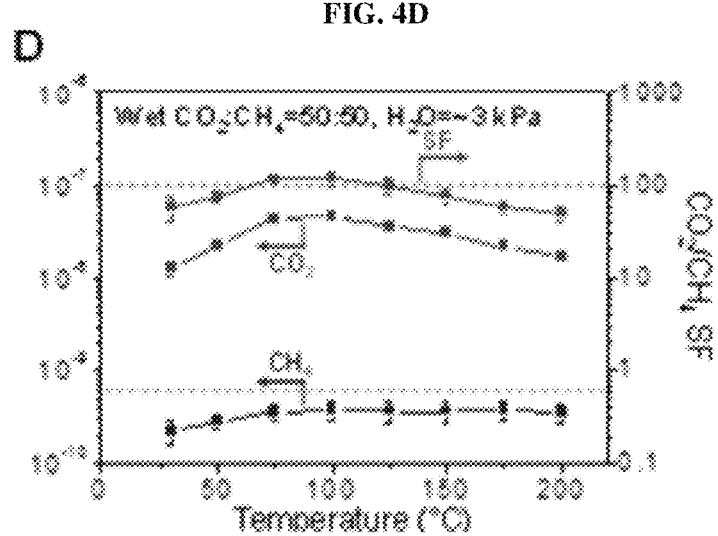

The separation performance of DDR@CHA_10d depending on the temperature of the $CO_2/N_2$ and $CO_2/CH_4$ two-component mixtures having the same concentration is shown in the graphs of FIGS. 4A and 4D. In particular, both dry conditions (FIGS. 4A and 4C) and wet conditions (FIGS. 4B and 4D) were considered to determine the effect of the third largest amount of water vapor in biogas (associated with $CO_2/CH_4$ separation) and flue gases (associated with $CO_2/N_2$ separation) generated in thermal power plants on the separation performance. First, under dry conditions, the $CO_2$ permeance decreased monotonously with increasing temperature, while the permeance of other permeation components ($N_2$ or $CH_4$) did not change with temperature. The $CO_2$ permeance behavior as a function of temperature was very similar in the $CO_2/N_2$ and $CO_2/CH_4$ mixtures, which means great contribution of the preferential adsorption of $CO_2$ (E. Kim et al., *Chem. Eng. J.* 306, 876-888 (2016)). This separation behavior similar to that of conventional ZSM-58 membranes with homogeneous crystal structures indicates that the DDR zeolite is a major component in the DDR@CHA composite membrane. The highest separation factors for $CO_2/N_2$ and $CO_2/CH_4$ separation were found at the lowest temperature of 30° C., and in particular, the maximum separation factors were 15.2±0.4 for $CO_2/N_2$ and 279±38 for $CO_2/CH_4$. Although the size difference between $N_2$ (0.364 nm) and $CH_4$ (0.38 nm) molecules is very small, the difference in the separation factors corresponding thereto is large, which means that the molecular sieve ability is very sensitive to the size of the permeated molecule.

Compared to the dry conditions, the inherent permeance behaviors of the component ($N_2$ or $CH_4$) and slowly permeating $CO_2$ were observed under wet conditions (FIGS. 4B and 4D). In particular, the permeance of all permeable components ($CO_2$, $N_2$ and $CH_4$) in the low temperature range of 30 to 100° C. is considered to decrease due to the inhibition of water molecules adsorbed on the membrane surface under wet conditions (M. P. Bernal et al., *AIChE J.* 50, 127-135 (2004)). As the temperature increased from 30° C. to 75° C., the adsorption of water vapor weakened and the permeance of $CO_2$ and other components and the corresponding separation factors gradually increased. This is returned to the same value as observed under the dry conditions (FIGS. 4A and 4C). In fact, at 100° C. or more under wet conditions, the permeance and separation factor were completely returned to the same values as permeance and separation factor obtained under dry conditions. Interestingly, the decrease in $CO_2$ permeance due to water vapor was greater than the permeance of other components that penetrate very slowly, resulting in a decrease of the corresponding separation factor in the temperature range of 30 to 75° C. under wet conditions. Nevertheless, even when water vapor is present, the $CO_2$ permeance selectivity of DDR@CHA_10d is very high. When taking into consideration the fact that the $CO_2/N_2$ separation factor is 9.1±3.6, the $CO_2/CH_4$ separation factor is 78±9 at 50° C., and flue gas and biogas from coal-burning thermal power plants contain water vapor at a pressure up to ~12 kPa in the temperature range of about 50 to 60° C. (D. Singh et al., *Energy Convers. Manag.* 44, 3073-3091 (2003); T. C. Merkel et al., *J. Membr. Sci.* 359, 126-139 (2010); E. Ryckebosch et al., *Biomass Bioenergy* 35, 1633-1645 (2011); P. Weiland et al., *Appl. Microbiol. Biotechnol.* 85, 849-860 (2010)), the hydrophobic DDR@CHA_10d has reliable $CO_2$ permeance selectivity and thus can be expected to be applied in this field. In addition, the more realistic separation performance of DDR@CHA_10d in the exhaust gas conditions after combustion is almost the same as the values shown in FIGS. 4A and 4B. DDR@CHA_10d shows a nearly linear response to carbon dioxide partial pressure change in the mixed gas due to the linear adsorption behavior of $CO_2$ molecules (FIGS. 18 and 19). This supports the reliable and flexible availability of DDR@CHA_10d with regard to various or varying molar compositions of $CO_2$ molecules.

TABLE 1

Thickness and contact angle of water droplet of DDR@CHA membranes

| Sample | Thickness (μm) | Contact angle of water droplet (°) |
|---|---|---|
| DDR@CHA_4d | 2.8 ± 0.3 | 19 |
| DDR@CHA_6d | 4.3 ± 0.4 | 48 |
| DDR@CHA_8d | 6.0 ± 0.4 | 73 |
| DDR@CHA_10d | 7.0 ± 0.3 | 83 |
| DDR@CHA_12d | 7.8 ± 0.4 | 100 |

Figure 4E:
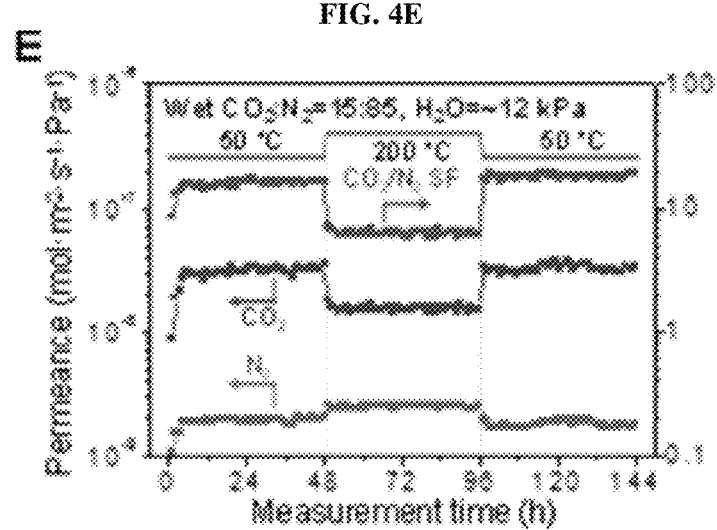
Figure 4F:
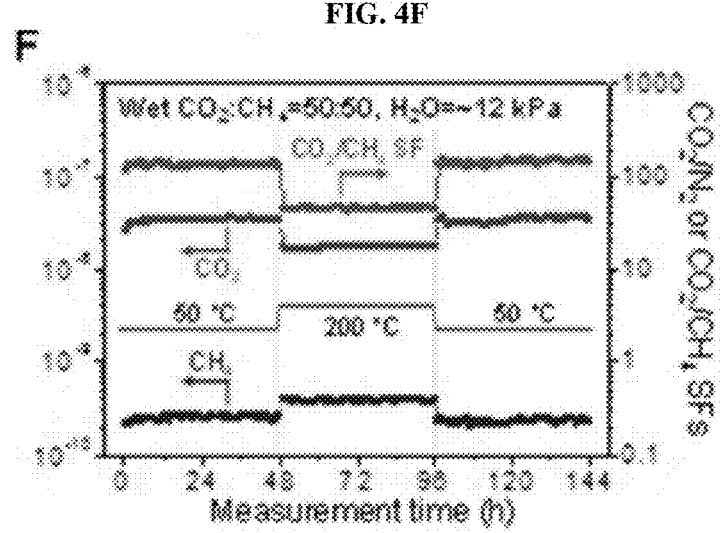
Figure 5A:
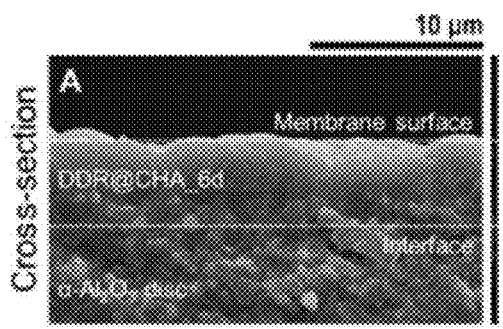
FIG. 5A to FIG. 5H are images obtained by visualization of internal defects of DDR@CHA membrane series obtained through heterogeneous epitaxial growth according to an embodiment of the present invention.
Figure 5B:
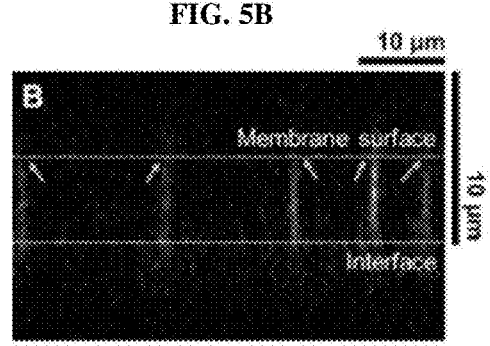
Figure 5C:
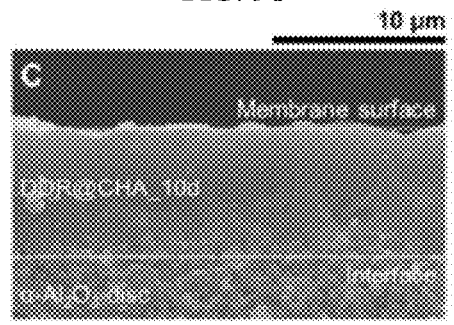
Figure 5D:
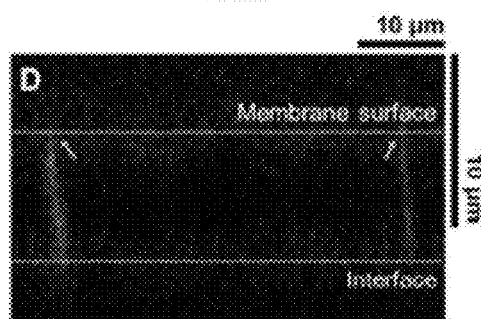
Figure 5E:
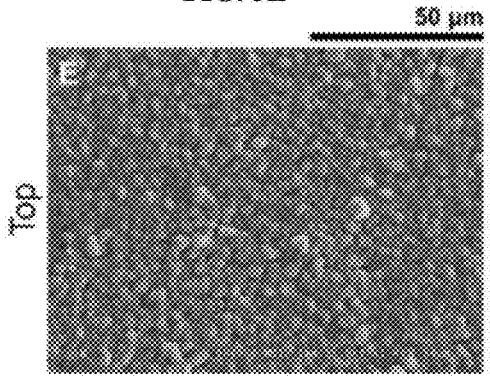
Figure 5F:
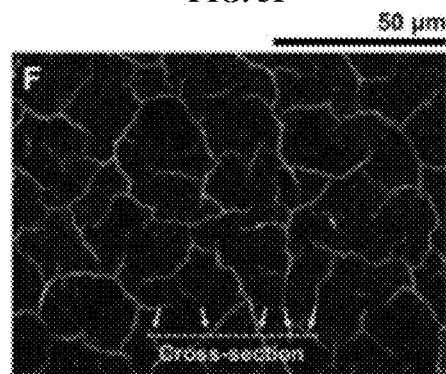
Figure 5G:
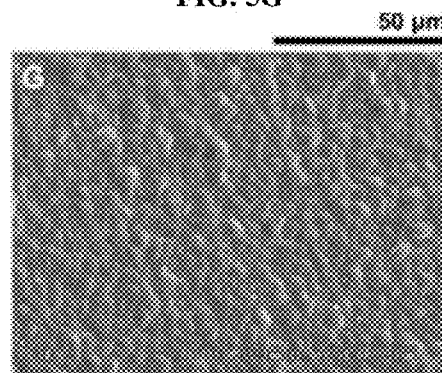
Figure 5H:
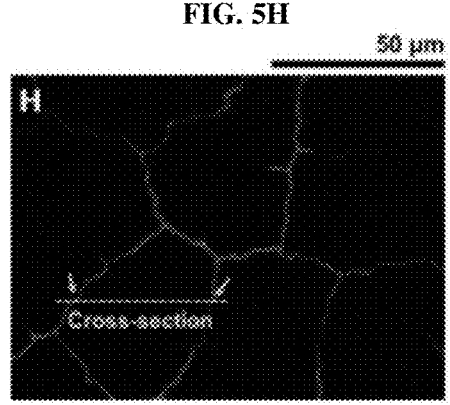
Figure 20A:
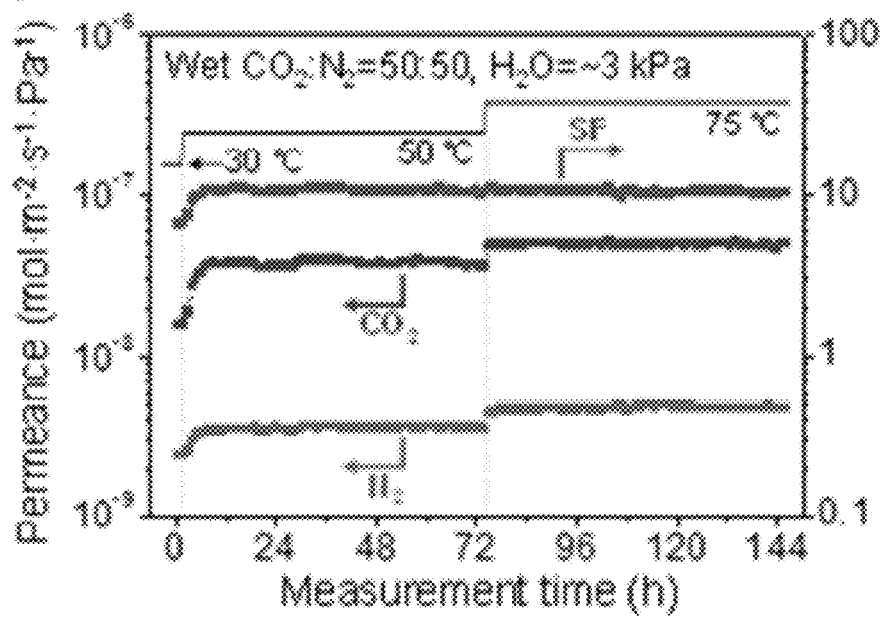
FIG. 20A and FIG. 20B are graphs showing the results of long-term stability test of DDR@CHA_10d under wet conditions according to an embodiment of the present invention.
Figure 20B:
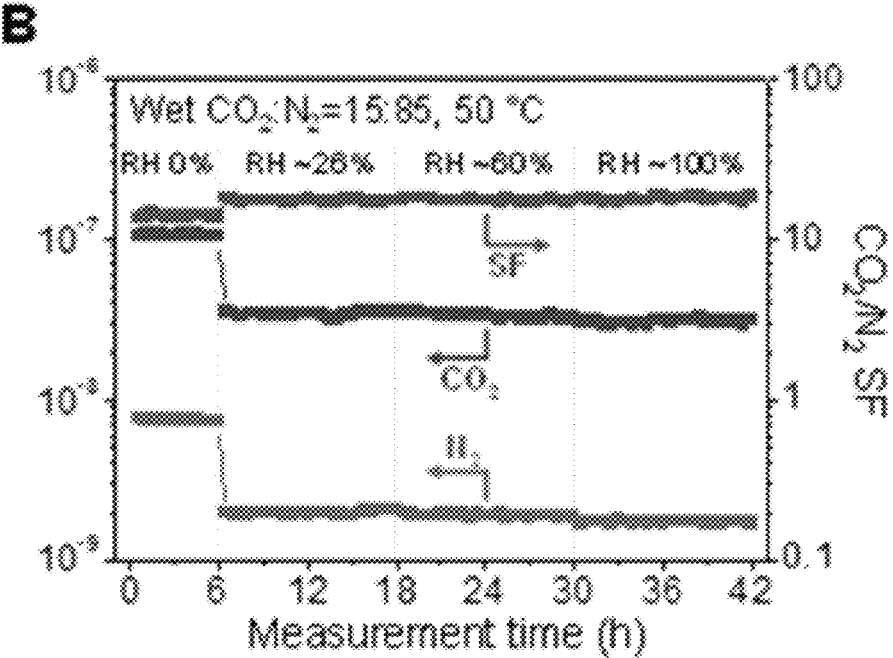

The major advantages of using zeolite membranes include robustness and suitability for long-term and practical applications. In the robustness experiment, DDR@CHA_10d was exposed to the same concentration of $CO_2/N_2$ at 50° C. and 75° C., which are typical flue gas temperatures under wet conditions (FIG. 20A). There was neither deactivation nor degradation in performance in DDR@CHA_10d at each temperature for 3 days, which indicates the robustness of the membrane. In addition, the effect of relative humidity on the performance of DDR@CHA_10d was determined (FIG. 20B). Specifically, after measuring for 6 hours at 50° C. under dry conditions (i.e., 0% relative humidity) with a simulated flue gas composition of $CO_2$:$N_2$=15:85, separation performance depending on relative humidity (~26%, ~60%, ~100%) was measured for 12 hours at 50° C. (FIG. 20B). At each relative humidity, the $CO_2$ permeability and $CO_2$/$N_2$ separation factor through DDR@CHA_10d were well maintained, which shows that the hydrophobic zeolite membrane has the desirable properties. In addition, the $CO_2$ permeance selectivity of DDR@CHA_10d was determined for flue gas under actual wet conditions similar to those of coal-burning thermal power plants having a water vapor pressure of ~12 kPa (relative humidity 100%) at 50° C. (FIG. 4E). Initial experiments for up to two days show reliable $CO_2$ permeance selectivity and the corresponding $CO_2$/$N_2$ separation factor of 17. In addition, an attempt was made to accelerate deactivation by conducting the experiment at an increased temperature of 200° C. for 2 days. Nevertheless, the $CO_2$ permeance selectivity of DDR@CHA_10d was maintained well for an additional 2 days (FIG. 4E), strongly suggesting high long-term stability. In the same way, the permeance selectivity of DDR@CHA_10d was measured at 50° C. for a $CO_2$/$CH_4$ mixture of the same concentration under wet conditions having a water vapor pressure of ~12 kPa (FIG. 4F)). This long-term stability experiment clearly demonstrates the robustness of DDR@CHA_10d, which is essential for reliable use in actual separation processes.

Permeance experiments of DDR@CHA_10d were conducted on, in addition to the $CO_2$/nitrogen composition at equimolar concentrations, other $CO_2$/$N_2$ mixing ratios ($CO_2$:$N_2$=15:85 and $CO_2$:$N_2$=5:95) which are similar to those of flue gas emissions from power plants through coal and natural gas combustion (FIG. 18). It should be noted that the permeance behavior of $CO_2$ and $N_2$ molecules under both dry and wet conditions is similar to those observed in FIGS. 4A and 4B, which indicates a linear response of DDR@CHA_10d to the partial pressure change of $CO_2$ and $N_2$ molecules. In particular, the highest $CO_2$/$N_2$ separation factor at 30° C. under dry conditions is 17.0±1.0 for the composition of $CO_2$:$N_2$=15:85 and is 20.0±1.3 (FIG. 18C) for the composition of $CO_2$:$N_2$=5:95, compared to 15.2±0.4 (FIG. 4A) for the composition of $CO_2$:$N_2$=50:50 (FIG. 18A). As the partial pressure of the $CO_2$ molecule decreased, the $CO_2$ permeability increased slightly and the maximum $CO_2$/$N_2$ separation factor gradually increased. The reason for this is considered that as the slope of the adsorption isotherm increases when the $CO_2$ partial pressure is low, the adsorption capacity favoring $CO_2$ increases (E. Kim et al., Chem. Eng. J. 306, 876-888 (2016); S. Himeno et al., Ind. Eng. Chem. Res. 46, 6989-6997 (2007)). Similarly, the $CO_2$/$N_2$ separation factor is 13.9±1.3 (FIG. 18B) for $CO_2$:$N_2$=15:85, and is 16.5±3.1 for $CO_2$:$N_2$=5:95±3.1 (FIG. 18D) at 50° C. under wet conditions, typical flue gas conditions.

FIG. 19 shows the molar flux and the permeance of $CO_2$ and $N_2$ molecules in accordance with the molar ratio composition of the $CO_2$ molecules in the feed mixture at 30° C. along with the corresponding $CO_2$/$N_2$ separation factors. The partial pressure of carbon dioxide in the feed mixture increased, but the molar flux of carbon dioxide did not increase greatly. Thus, the corresponding $CO_2$ permeability decreased monotonously under dry conditions (FIGS. 19A and 19C). In contrast, the molar flux of $N_2$ molecules increases with increasing partial pressure, and $N_2$ molecules have nearly constant permeability under dry conditions (FIGS. 19A and 19C). This can be attributed to the high adsorption behavior of $CO_2$ at the low pressure mentioned above, whereas the adsorption isotherm of $N_2$ always follows a linear behavior up to 1 bar in accordance with Henry's law (E. Kim et al., Chem. Eng. J. 306, 876-888 (2016)). The molar flux of $CO_2$ molecules under wet conditions is lower than under dry conditions, but increases linearly as the partial pressure increases so that the carbon dioxide molecules have a constant permeability (FIGS. 19B and 19D). In contrast, the molar flux of $N_2$ molecules is nearly constant, the permeability at low compositions of $CO_2$ molecules is decreased, and at the same time, the $CO_2$/$N_2$ separation factor is increased (FIGS. 19B and 19D). Although $CO_2$/$N_2$ separation factors are various at various concentrations of carbon dioxide molecules, the use of hydrophobic DDR@CHA membranes can provide high $CO_2$/$N_2$ separation factors (equal to or greater than 10) at a saturated steam pressure and at 30° C.

Example 3: Determination of Defect Structure of DDR@CHA Membrane

Figure 17A:
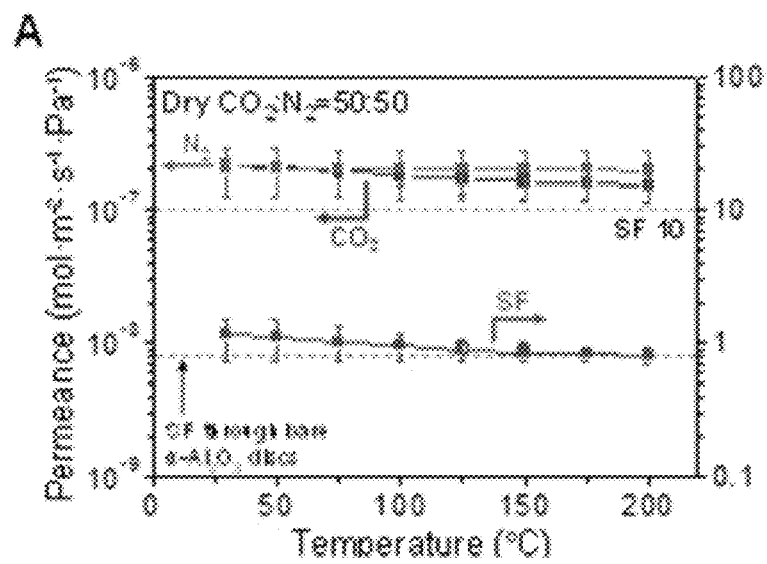
FIG. 17A to FIG. 17F are graphs showing $CO_2/N_2$ separation performance depending on secondary growth time according to an embodiment of the present invention.
Figure 17B:
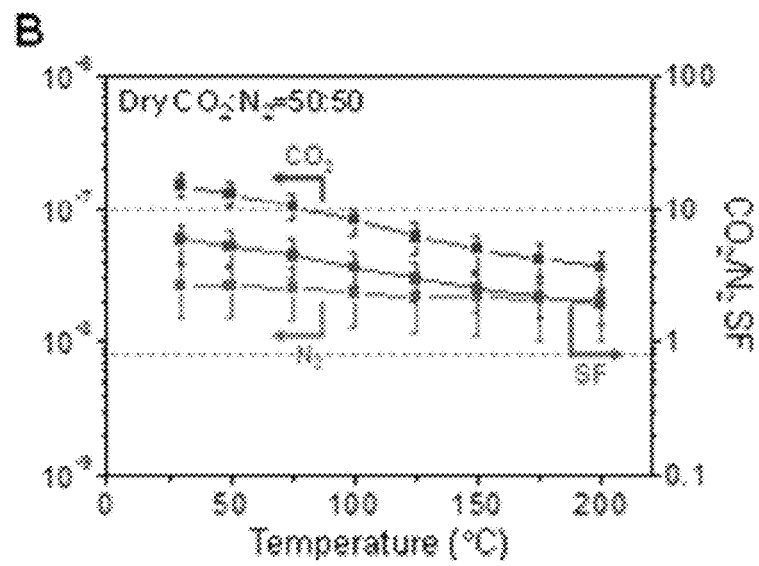
Figure 17C:
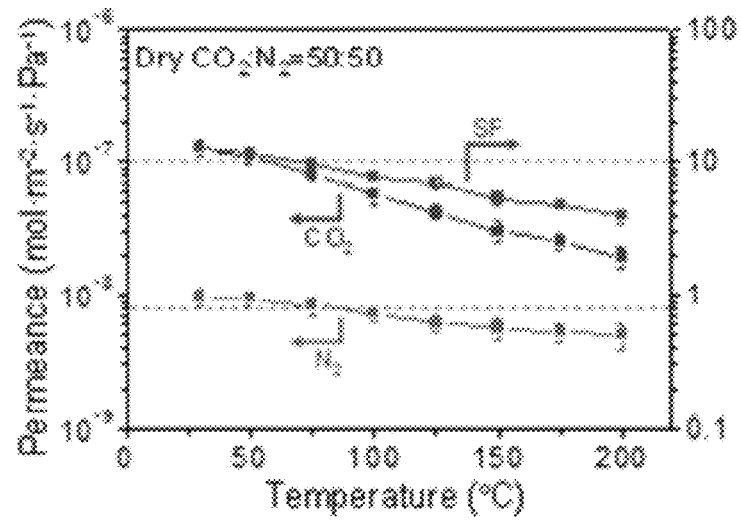
Figure 17D:
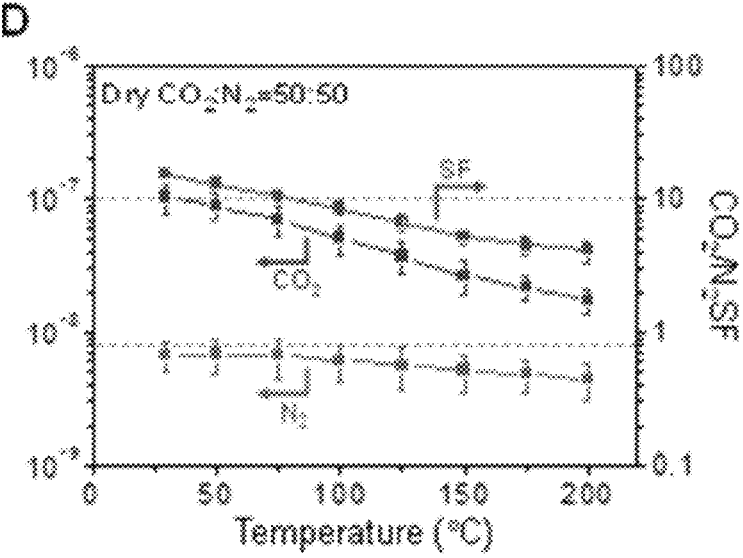
Figure 17E:
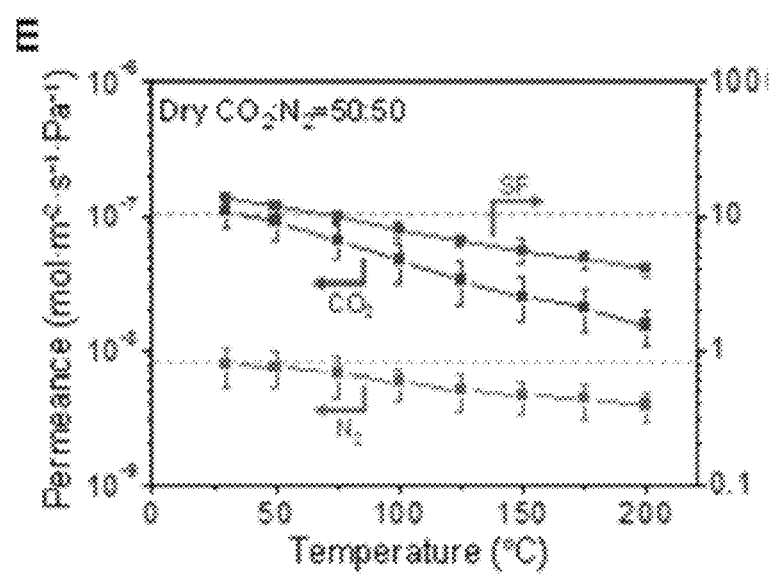
Figure 17F:
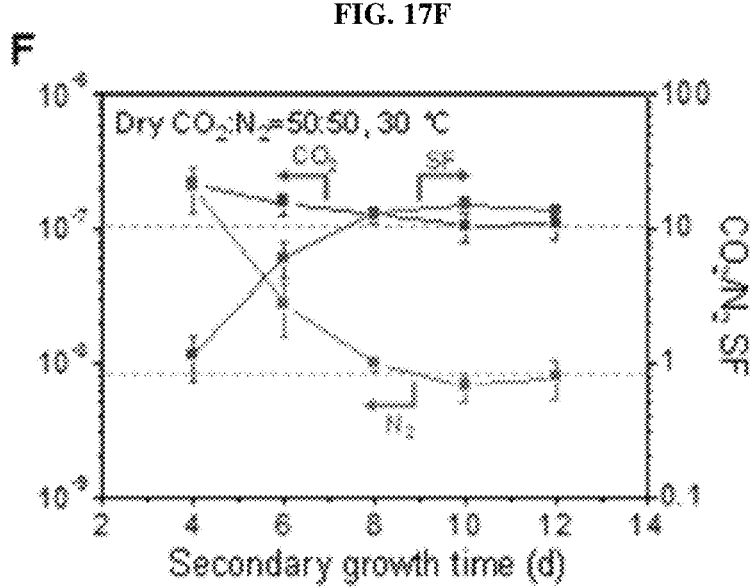
Figure 18A:
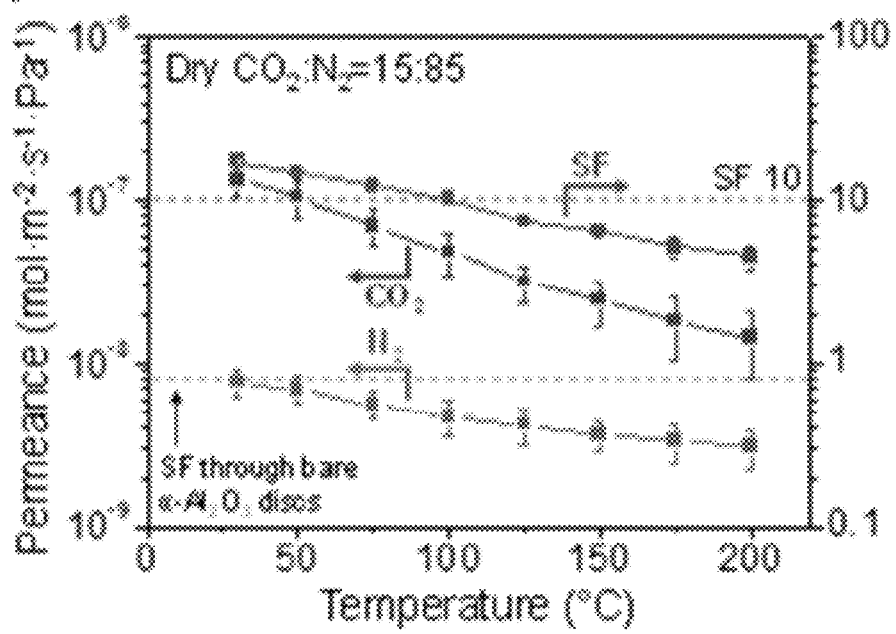
FIG. 18A to FIG. 18D are graphs showing the $CO_2/N_2$ separation performance depending on the molar composition of a feed gas according to an embodiment of the present invention.
Figure 18B:
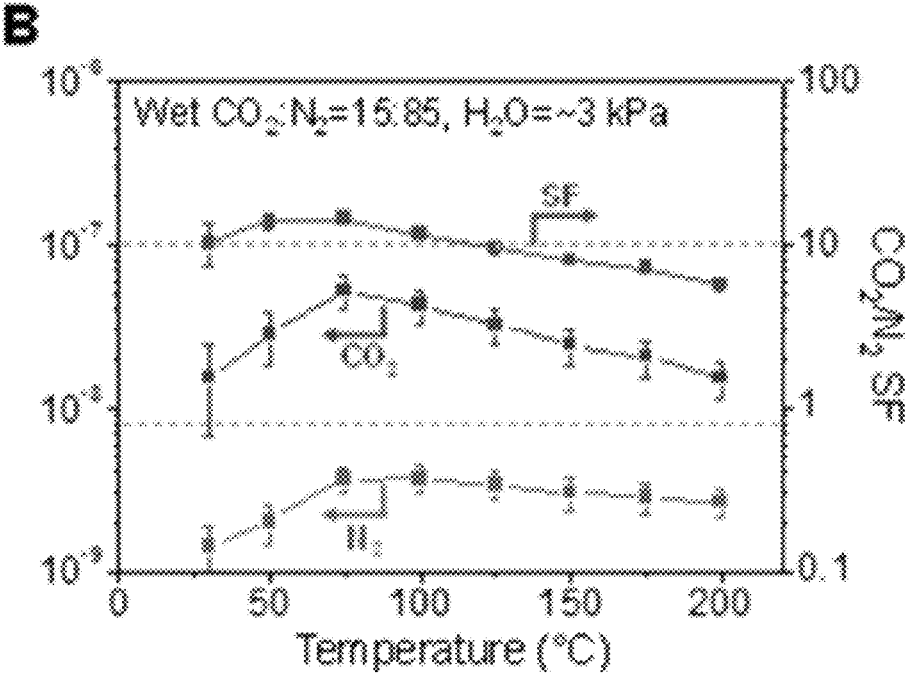
Figure 18C:
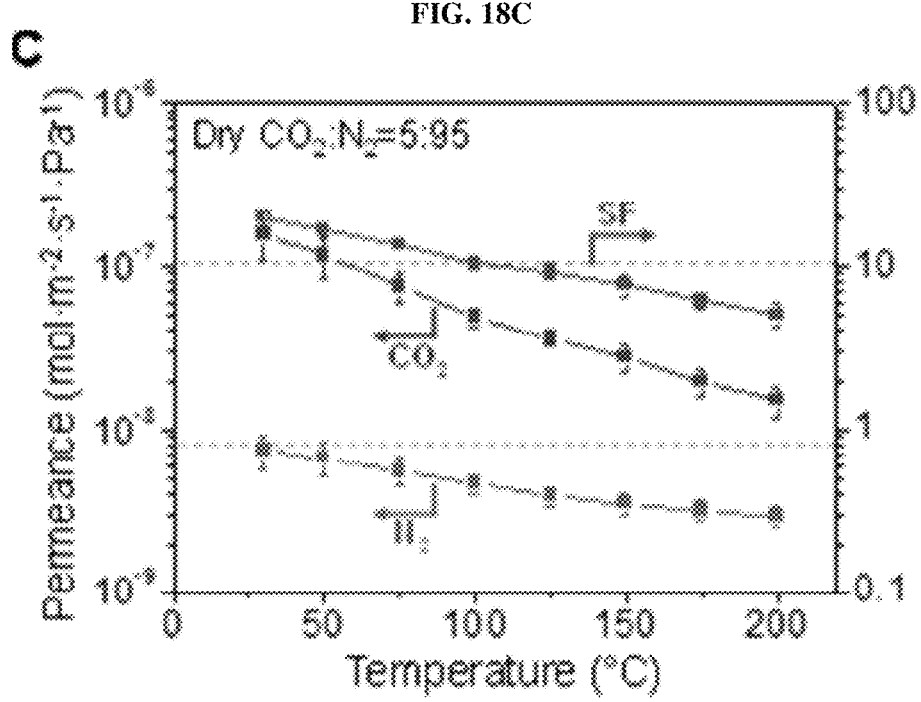
Figure 18D:
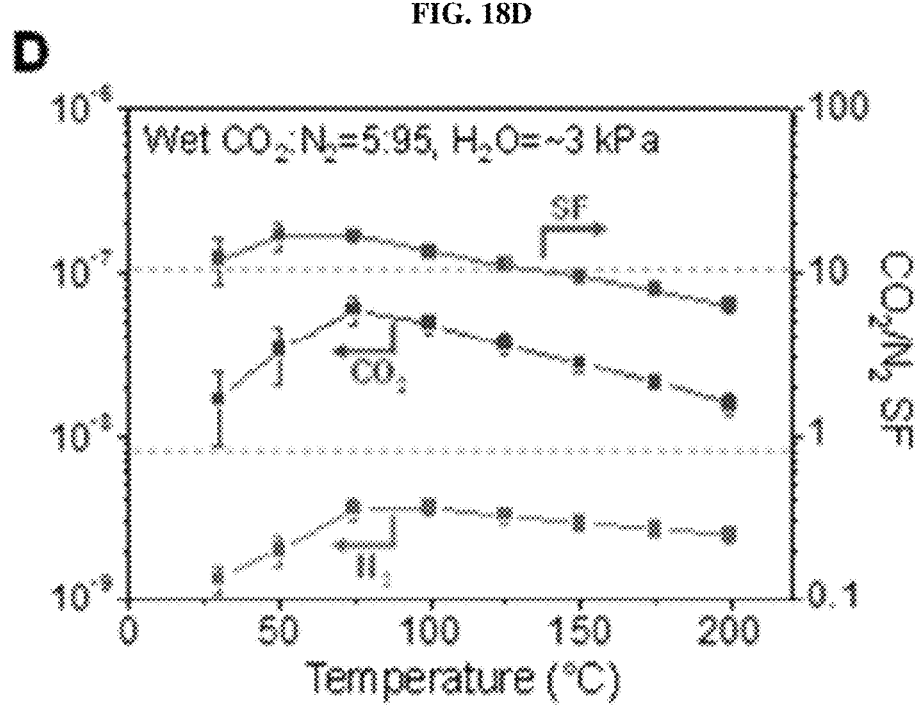
Figure 19A:
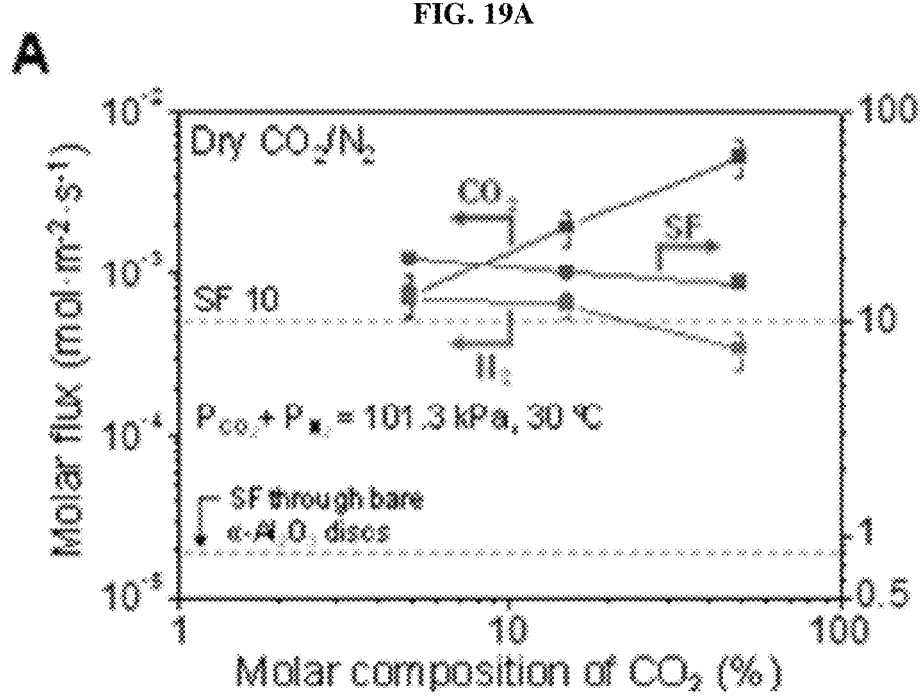
FIG. 19A to FIG. 19D are graphs showing the effect of $CO_2/N_2$ molar composition in a feed mixture on $CO_2/N_2$ separation performance in accordance with an embodiment of the present invention.
Figure 19B:
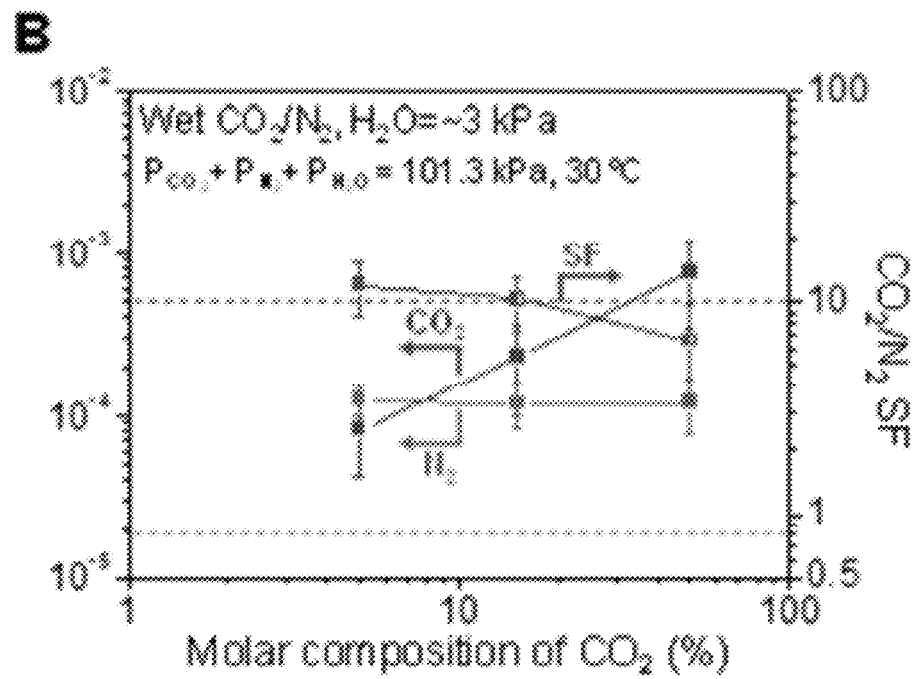
Figure 19C:
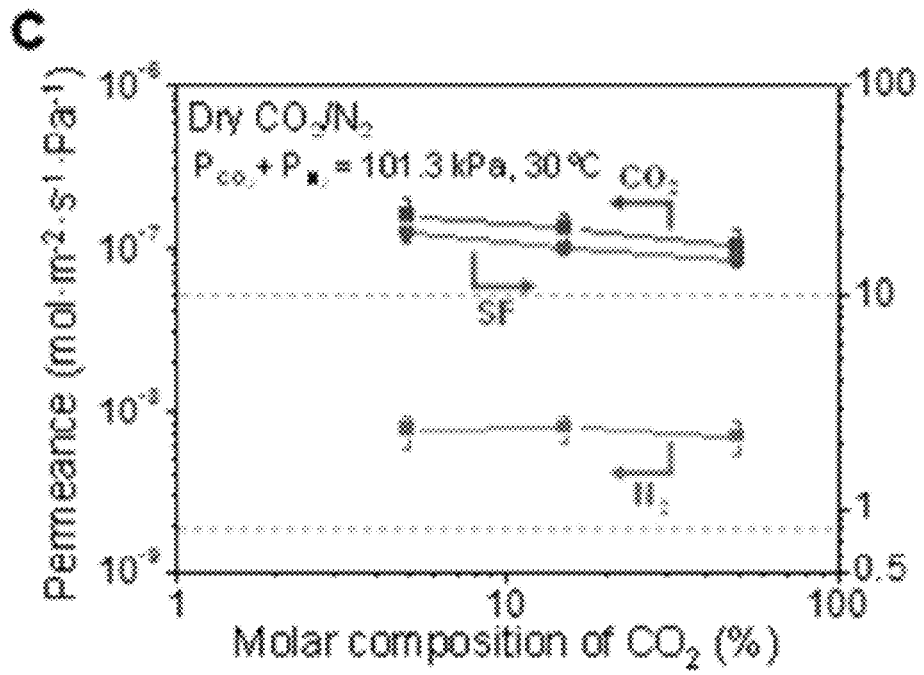
Figure 19D:
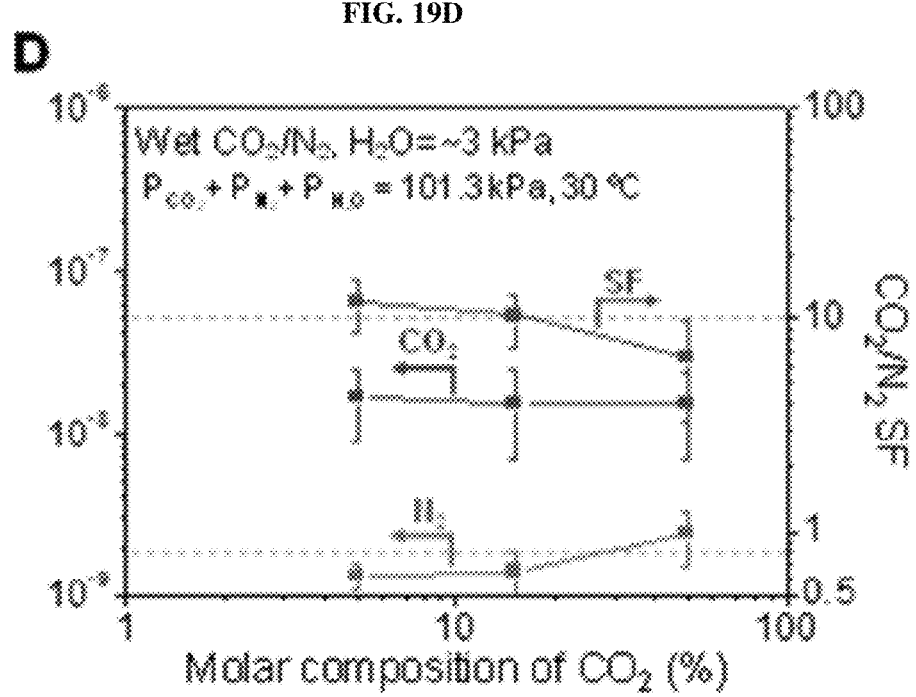
Figure 21:
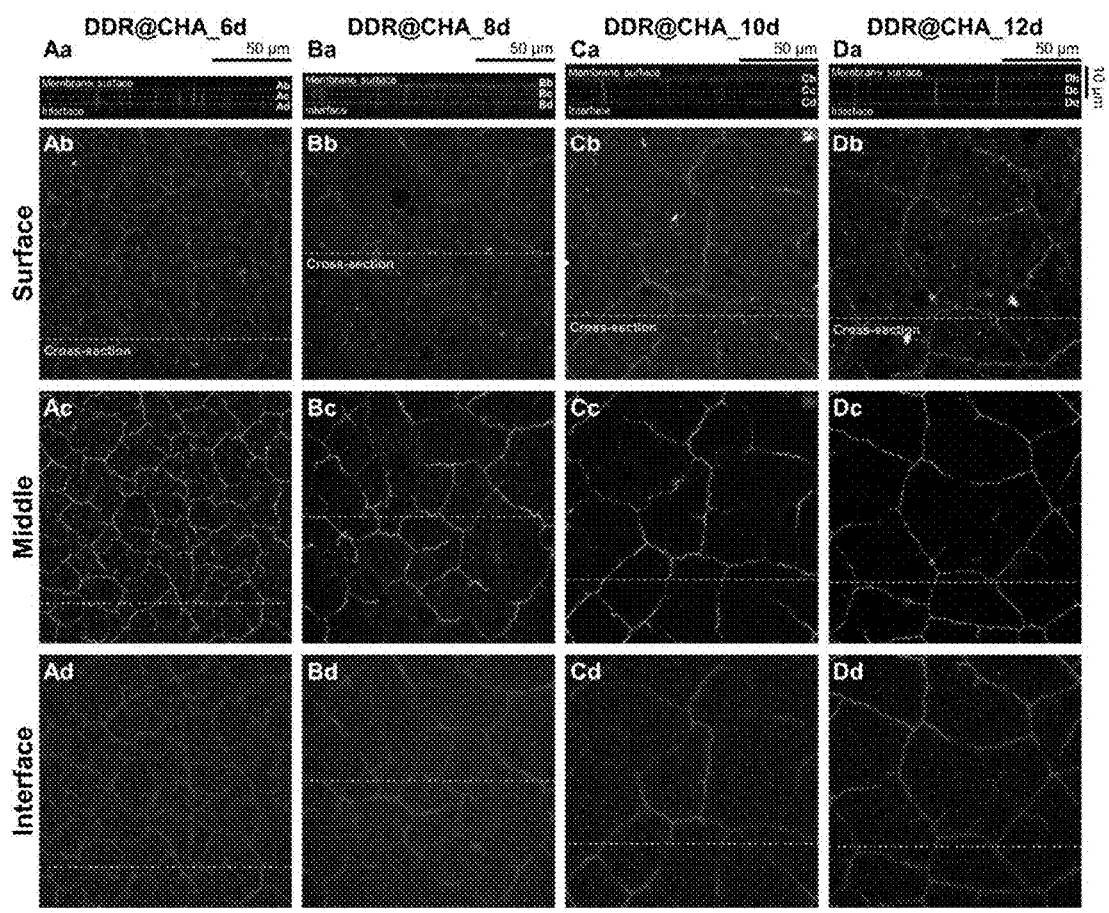
FIG. 21 is an image showing the result of analysis of the FCOM characteristics of the DDR@CHA membrane series according to an embodiment of the present invention.
Figure 22A:
FIG. 22A to FIG. 22H are images showing the result of analysis of the FCOM characteristics of the DDR@CHA membrane series according to an embodiment of the present invention.
Figure 22B:
Figure 22C:
Figure 22D:
Figure 22E:
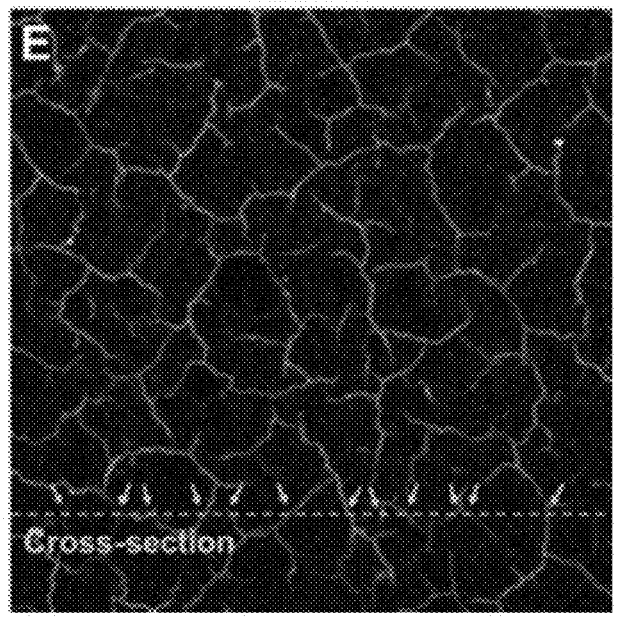
Figure 22F:
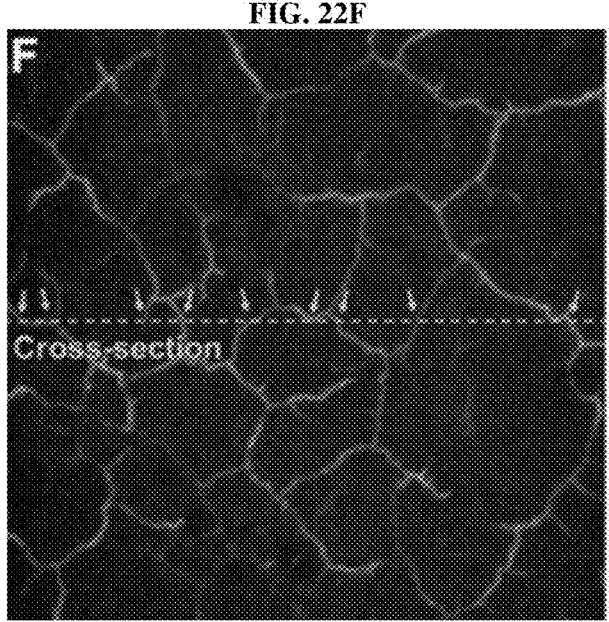
Figure 22G:
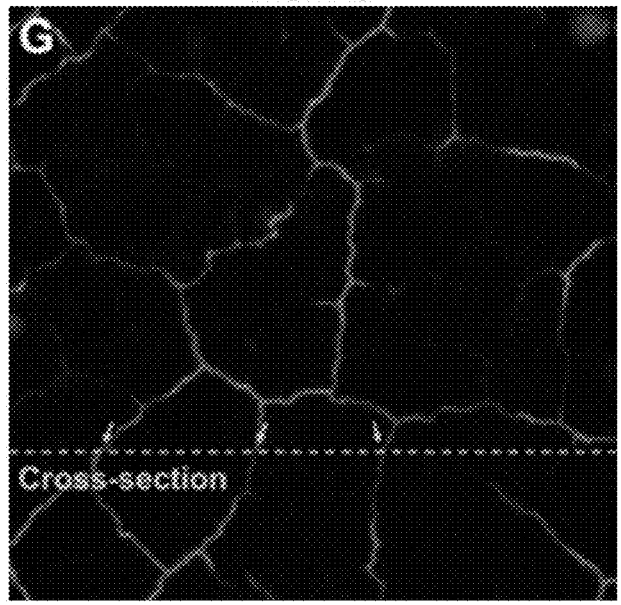
Figure 22H:
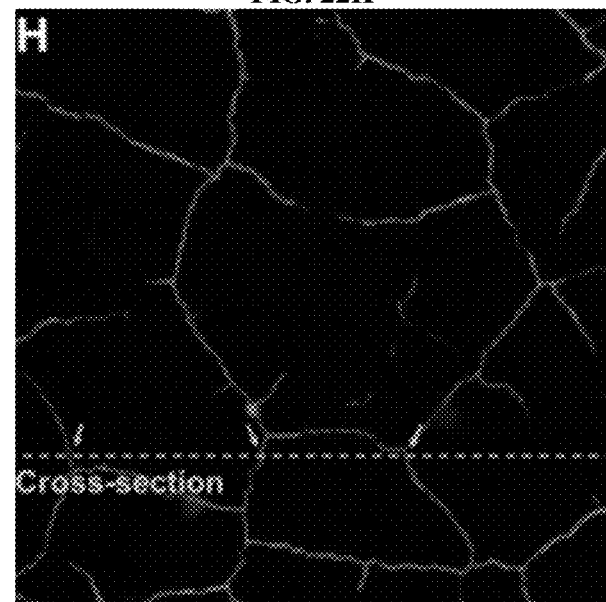

FIG. 5 shows SEM and FCOM images of the cross-sections and tops of DDR@CHA_6d and DDR@CHA_10d. In particular, DDR@CHA_6d and DDR@CHA_10d showed significant differences in $CO_2$ permeance selectivity under dry conditions, so these two membranes were selected for FCOM analysis (FIGS. 17B and 17D). Fluorescein sodium salts having a size of about 1 nm (J. Choi et al., Science 325, 590-593 (2009); S. Hong et al., Chem. Mater. 30, 3346-3358 (2018)) cannot penetrate zeolite pores (smaller than about 1 nm), but can intactly access defects in zeolite membranes (E. Kim et al., J. Mater. Chem. A 5, 11246-11254 (2017); S. Hong et al., Chem. Mater. 30, 3346-3358 (2018); G. Bonilla et al., J. Membr. Sci. 182, 103-109 (2001)). Clearly, both DDR@CHA_6d and DDR@CHA_10d have defects that extend to the interface between the DDR@CHA membrane and the $\alpha$-$Al_2O_3$ disc. Regarding the appearance of these defects, DDR@CHA_6d is remarkable in terms of density and frequency, which means that DDR@CHA_6d is more defective than DDR@CHA_10d. This behavior is more evident in the top FCOM image of DDR@CHA_6d and DDR@CHA_10d of FIG. 5. In fact, the density of defects is directly related to the $CO_2$ selective separation performance shown in FIGS. 4 and 17. DDR@CHA_10d has fewer defects than DDR@CHA_6d and thus shows much higher $CO_2$/$N_2$ SF under dry conditions (DDR@CHA_10d: ~15.2 vs. DDR@CHA_6d: ~6.0). For comparison, the FCOM results (DDR@CHA_8d and DDR@CHA_12d) of the different membranes are shown in FIGS. 21 and 22 along with the results of DDR@CHA_6d and DDR@CHA_10d. As the secondary growth time increased from 6 days to 12 days, the membrane thickness increased monotonously and reached a saturation state after 10 days, but the degree of defects tended to decrease monotonously, and steadily decreased up to 10 days and eventually did not change. This indicates that the further increased thickness due to the additional intergrowth of DDR grains in the DDR@CHA composite structure is preferable to avoid crack formation after the calcination process.

Example 4: Evaluation of Separation Performance of DDR@CHA 10d

Figure 6A:
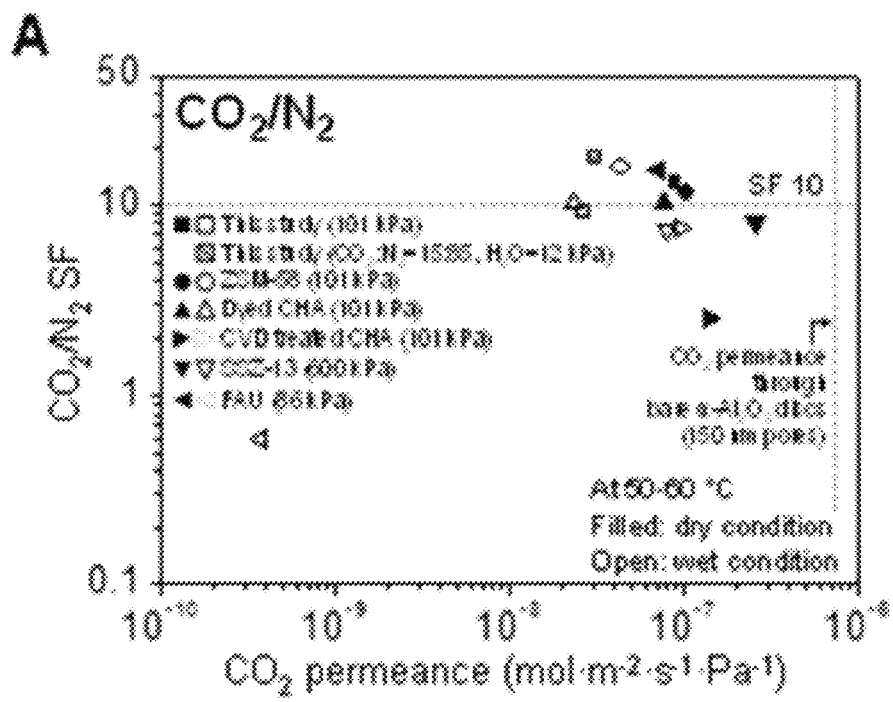
FIG. 6A and FIG. 6B are graphs showing the separation performance of the DDR@CHA membrane obtained through heterogeneous epitaxial growth according to an embodiment of the present invention.
Figure 6B:
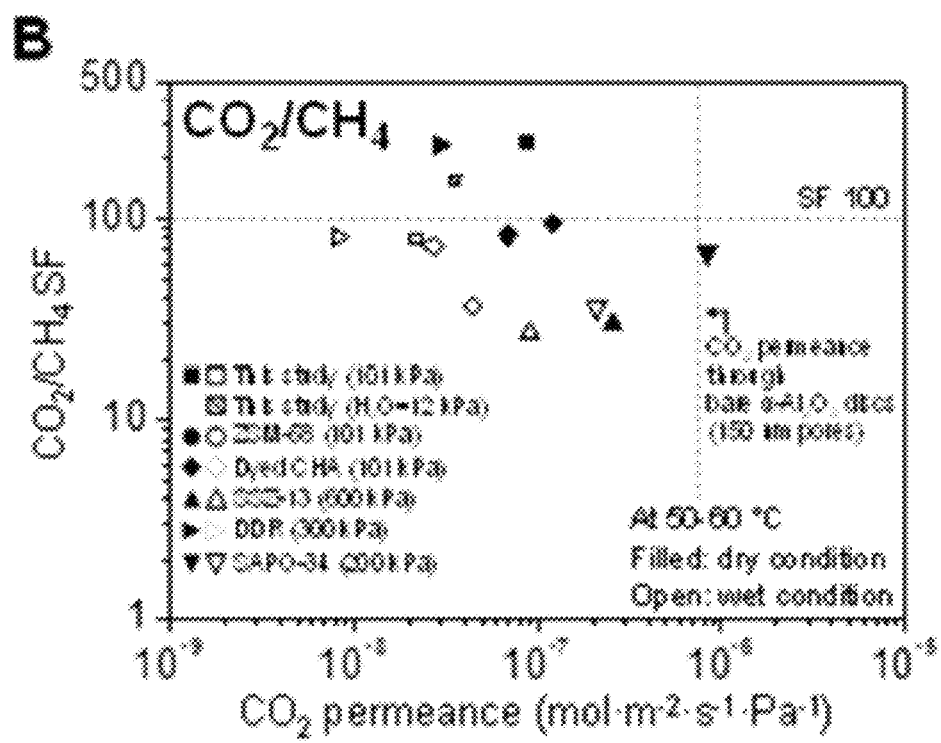

The $CO_2$/$N_2$ and $CO_2$/$CH_4$ separation performance of DDR@CHA_10d measured at about 50 to 60° C. is shown along with other zeolite membranes reported in the literature (FIGS. 6A and 6B). In particular, FIG. 6 shows the performance of the zeolite membrane measured under both dry (closed) and wet (open) conditions. DDR@CHA_10d produced through heterogeneous epitaxial growth shows excellent separation performance under both dry and wet conditions. In addition, DDR@CHA_10d exhibits separation performance superior or similar to CHA type zeolite membranes grown as single crystals (CHA: S. Hong et al., Chem. Mater. 30, 3346-3358 (2018); S. Hong et al., Chem. Mater. 30, 3346-3358 (2018); SSZ-13: N. Kosinov et al., J. Mater. Chem. A 2, 13083-13092 (2014); SAPO-34: Y. Chen et al., J. $CO_2$ Util. 18, 30-40 (2017); DDR: L. Wang et al., J. Membr. Sci. 539, 152-160 (2017); ZSM-58: E. Kim et al., J. Mater. Chem. A 5, 11246-11254 (2017); and FAU type: X. H. Gu et al., Ind. Eng. Chem. Res. 44, 937-944 (2005)). This shows the reliability of the composite membrane formation method used in the present invention. In dry conditions, DDR@CHA_10d showed similar or better separation performance than CHA and DDR zeolite-type membranes (FIG. 6A). In contrast, FAU-type zeolite (NaY) membranes having high hydrophilicity show slightly higher $CO_2/N_2$ separation factors under dry conditions, but significantly worsened $CO_2/N_2$ separation factors under wet conditions. The clear reason for this is that water vapor adsorption is preferred over $CO_2$ molecule adsorption. Although the use of highly hydrophilic FAU zeolites as membrane components is a preferred approach under dry conditions, such membranes are not suitable for ensuring high $CO_2$ permeance selectivity under wet conditions. More preferably, the hydrophobic DDR@CHA_10d obtained through effectively heterogeneous epitaxial growth shows high performance even in an actual flue gas composition (water vapor pressure thereof is ~12 kPa in a composition of $CO_2:N_2$=15:85 at 50° C.) (FIG. 6A).

In addition, DDR@CHA_10d showed a very high $CO_2/CH_4$ separation factor of 238 (at 50° C.) under dry conditions at the actual biogas temperature of 50 to 60° C. compared to other zeolite membranes (FIG. 6B). This strongly indicates that the composite DDR@CHA membrane was formed reliably. As observed during the $CO_2/N_2$ separation, DDR@CHA_10d maintained a high $CO_2/CH_4$ separation factor at 50° C. under wet conditions (78 at a water vapor pressure of ~3 kPa, and 145, which is higher, at a water vapor pressure of ~12 kPa) (FIG. 6B). FIG. 6B clearly shows that DDR@CHA_10d exhibits $CO_2/CH_4$ separation performance superior to that of other zeolite membranes, and supports the reliability of the method according to the present invention for securing hydrophobicity in the synthesis of membranes. In addition, DDR@CHA_10d shows the best $CO_2/CH_4$ separation at a saturation water vapor pressure (~12 kPa) and at 50° C. Nevertheless, the current $CO_2$ permeability through DDR@CHA_10d under wet conditions associated with the size of the membrane module should be increased by at least one order of magnitude for practical application. As inferred from the minor change in $CO_2$ permeability between DDR@CHA_xd (x=6, 8, 10, 12) in FIG. 17F, the final permeability of the DDR@CHA membrane series is greatly influenced and limited by the support resistance. Therefore, the next step towards practical application is to produce a DDR@CHA composite membrane on a support having high permeability.

Overall, the concept of heterogeneous epitaxial growth has proven effective for the continuous production of zeolite membranes having high performance. In particular, this is considered a first alternative and reliable method for obtaining $CO_2$-permeance-selective DDR@CHA composite membranes. Unlike conventional methods, the heterogeneous epitaxial growth of the SSZ-13 (CHA-type zeolite) seed layer together with the synthetic solution that induces the synthesis of the DDR-type zeolite is a highly reproducible method capable of forming a composite membrane including a main part of the DDR phase. In particular, the structural similarity between CHA- and DDR-type zeolites is key to the growth of heterogeneous epitaxial growth membranes. Preferably, the composite membrane produced in the present invention showed excellent $CO_2$ permeance selectivity for the $CO_2/N_2$ and $CO_2/CH_4$ binary mixtures. Since the surface of the membrane is highly hydrophobic, the membrane maintained high $CO_2$ permeance selectivity even under wet conditions. The performance is the highest among the separation performance of conventional zeolite membranes, showing particularly high performance with regard to mixed gas separation under wet conditions during an actual separation process.

INDUSTRIAL APPLICABILITY

The heterogeneous zeolite membrane according to the present invention has high carbon dioxide/nitrogen and carbon dioxide/methane separation performance under both dry and wet conditions compared to conventional zeolite membranes. In addition, the heterogeneous zeolite membrane includes CHA and DDR zeolite, having excellent ability to capture carbon, and thus has high carbon dioxide separation performance.

Although specific configurations of the present invention have been described in detail, those skilled in the art will appreciate that this description is provided to set forth preferred embodiments for illustrative purposes and should not be construed as limiting the scope of the present invention. Therefore, the substantial scope of the present invention is defined by the accompanying claims and equivalents thereto.

The invention claimed is:

1. A method of preparing a heterogeneous zeolite separation membrane comprising:
   (a) forming a seed layer by depositing zeolite particles having a DDR structure on a support; and
   (b) producing a CHA@DDR heterogeneous zeolite separation membrane by performing hydrothermal synthesis on the support having the seed layer in the presence of a CHA precursor solution.

2. The method of preparing a heterogeneous zeolite separation membrane of claim 1, wherein the CHA precursor solution comprises an organic-structure-directing agent, $SiO_2$, $H_2O$, $Na_2O$ and $Al_2O_3$ at a molar ratio of 1 to 100:100:1000 to 20000:0.5 to 50:0 to 10, and the organic-structure-directing agent comprises at least one selected from the group consisting of TMAdaOH (N,N,N-trimethyl adamantylammonium hydroxide), TMAdaBr (N,N,N-trimethyl adamantylammonium bromide), TMAdaF (N,N,N-trimethyl adamantylammonium fluoride), TMAdaCl (N,N,N-trimethyl adamantylammonium chloride), TMAdaI (N,N,N-trimethyl adamantylammonium iodide), TEAOH (tetraethylammonium hydroxide), TEABr (tetraethylammonium bromide), TEAF (tetraethylammonium fluoride), TEACl (tetraethylammonium chloride), TEAI (tetraethylammonium iodide), dipropylamine and cyclohexylamine.

3. The method of preparing a heterogeneous zeolite separation membrane of claim 1, wherein the support is at least one selected from the group consisting of α-alumina, γ-alumina, polypropylene, polyethylene, polytetrafluoroethylene, polysulfone, polyimide, silica, glass, mullite, zirconia, titania, yttria, ceria, vanadia, silicon, stainless steel, carbon, calcium oxide and phosphorus oxide.

4. The method of preparing a heterogeneous zeolite separation membrane of claim 1, wherein step of (b) is carried out at a temperature of 100 to 200° C. for 12 to 300 hours.

5. The method of preparing a heterogeneous zeolite separation membrane of claim 1, further comprising drying after hydrothermal synthesis of step of (b).

6. A method of separating $CO_2$ from a mixture containing $CO_2$ and a molecule selected from the group consisting of $CH_4$, $N_2$, $O_2$, $C_2H_4$, $C_2H_6$, $C_3H_6$ and $C_3H_8$ using the heterogeneous zeolite separation membrane produced by the method of claim 1.

7. The method of separating $CO_2$ of claim 6, which is carried out at a temperature of 25 to 200° C. under dry or wet conditions.

* * * * *